US012620875B2

(12) United States Patent (10) Patent No.: US 12,620,875 B2
Takeda (45) Date of Patent: May 5, 2026

(54) BATTERY-POWERED WHEELBARROW

(71) Applicant: MAKITA CORPORATION, Anjo (JP)

(72) Inventor: Kouichi Takeda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 649 days.

(21) Appl. No.: 17/839,792

(22) Filed: Jun. 14, 2022

(65) Prior Publication Data

US 2022/0407397 A1 Dec. 22, 2022

(30) Foreign Application Priority Data

Jun. 16, 2021 (JP) ................................. 2021-100461

(51) Int. Cl.
*H02K 11/33* (2016.01)
*B62B 5/00* (2006.01)
*H02K 5/22* (2006.01)

(52) U.S. Cl.
CPC ............ *H02K 11/33* (2016.01); *B62B 5/0046* (2013.01); *B62B 5/0053* (2013.01); *B62B 5/0069* (2013.01); *H02K 5/225* (2013.01)

(58) Field of Classification Search
CPC ... B62B 5/0046; B62B 5/0053; B62B 5/0069; B62B 5/0404; H02K 11/33; H02K 5/225; H02K 7/1025; Y02T 10/70
USPC ........................................................ 310/139
See application file for complete search history.

(56) References Cited

U.S. PATENT DOCUMENTS

| | | | |
|---|---|---|---|
| 8,579,384 B2 * | 11/2013 | Bennett ................. | B60T 13/662 |
| | | | 303/3 |
| 10,286,883 B2 * | 5/2019 | Fujiwara ................. | B60T 7/085 |
| 2004/0040775 A1 * | 3/2004 | Shimizu ................... | B60K 6/52 |
| | | | 903/902 |
| 2013/0207581 A1 | 8/2013 | Aoki | |
| 2019/0023265 A1 | 1/2019 | Takeda et al. | |
| 2019/0097551 A1 | 3/2019 | Nagarajan et al. | |
| 2020/0180439 A1 * | 6/2020 | Chung ................... | B62B 3/001 |

FOREIGN PATENT DOCUMENTS

| | | | | |
|---|---|---|---|---|
| AT | 125600 B | 11/1931 | | |
| CN | 103248295 A | 8/2013 | | |
| CN | 106926882 A | 7/2017 | | |
| JP | 2001198163 A | * 7/2001 | | |
| JP | 2002095114 A | * 3/2002 | | |
| JP | 2017205002 A | * 11/2017 | .......... | B60L 15/2009 |
| JP | 2019-022338 A | 2/2019 | | |

OTHER PUBLICATIONS

Feb. 4, 2025 Office Action issued in Japanese Patent Application No. 2021-100461.
Feb. 14, 2026 Office Action issued in Chinese Patent Application No. 202210628905.8.

* cited by examiner

*Primary Examiner* — Alex W Mok
(74) *Attorney, Agent, or Firm* — Oliff PLC

(57) ABSTRACT

One aspect of the present disclosure provides a battery-powered wheelbarrow including a battery housing, a motor, a wheel, a drive circuit, and a control circuit. The control circuit activates, during a drive requirement of the motor not being satisfied, dynamic braking. The control circuit decreases the dynamic braking through the drive circuit in accordance with a lapse of time in response to a first transition having occurred or occurring.

20 Claims, 17 Drawing Sheets

BRAKING-START DETERMINATION PROCESS (S502)

S511   MOTOR ROTATIONAL SPEED > R5?

S512   MOTOR CURRENT VALUE < CURRENT THRESHOLD?

S513   SET BRAKING-START REQUEST FLAG

RETURN

SECOND DEACTIVATE DETERMINATION PROCESS (S402)

S411   MOTOR ROTATIONAL SPEED < R4?

S412   CONTROLLED BRAKE VARIABLE < M1%?

S413   BRAKE DEACTIVATE PROCESS (PERMISSION OF BRAKE DEACTIVATING)

RETURN

BATTERY-POWERED WHEELBARROW

CROSS-REFERENCE TO RELATED APPLICATIONS

The present disclosure claims the benefit of Japanese Patent Application No. 2021-100461 filed on Jun. 16, 2021 with the Japan Patent Office, the entire disclosure of which is incorporated herein by reference.

BACKGROUND

The present disclosure relates to a battery-powered wheelbarrow.

Japanese Unexamined Patent Application Publication No. 2019-022338 discloses a battery-powered wheelbarrow with motor-driven wheels. This wheelbarrow includes a mechanical brake device. The mechanical brake device directly applies a braking force to a wheel of the wheelbarrow using a friction force. Further, the wheel harrow includes dynamic braking. The dynamic braking generates the braking force in the motor by short-circuiting motor windings.

SUMMARY

The mechanical brake is manually adjustable by a user of the wheelbarrow, whereas the dynamic braking is controlled by a microcomputer in the wheelbarrow. In order to allow the user to stably use such battery-powered wheelbarrow, it is desired to properly control the dynamic braking.

In one aspect of the present disclosure, if is desirable that dynamic braking in a battery-powered wheelbarrow can be properly controlled.

One aspect of the present disclosure provides a battery-powered wheelbarrow (or a battery-powered dolly) including a battery housing. The battery housing accommodates a battery therein. The battery-powered wheelbarrow includes a motor. The motor includes two or more windings and two or more terminals. The two or more windings are connected to the two or more terminals. The battery-powered wheelbarrow includes a wheel driven by the motor. The battery-powered wheelbarrow includes a drive circuit. The drive circuit connects the two or more terminals to the battery in the battery housing so as to drive the motor. The drive circuit short-circuits at least two of the two or more terminals so as to activate a dynamic braking in the motor. The battery-powered wheelbarrow includes a control circuit.

The control circuit activates the dynamic braking through the drive circuit during a drive requirement of the motor not being satisfied.

The control circuit decreases the dynamic braking (or a braking force by the dynamic braking) through the drive circuit in accordance with a lapse of time (gradually, continuously, or stepwisely) in response to a first transition having occurred or occurring from the drive requirement not being satisfied to the drive requirement being satisfied.

The battery-powered wheelbarrow described above can control the dynamic braking properly.

In another aspect of the present disclosure, a method of controlling a dynamic braking is used in a battery-powered wheelbarrow. The method includes activating the dynamic braking to thereby inhibit the battery-powered wheelbarrow from moving. The method includes decrasing the dynamic braking in accordance with a lapse of time to thereby allow the battery-powered wheelbarrow to move.

The method can exert advantageous effects similar to the aforementioned battery-powered wheel barrow.

BRIEF DESCRIPTION OF THE DRAWINGS

An example embodiment of the present disclosure will be described hereinafter by way of example with reference to the accompanying drawings, in which.

DETAILED DESCRIPTION OF EXAMPLE EMBODIMENTS

Overview of Embodiment

Figure 1:
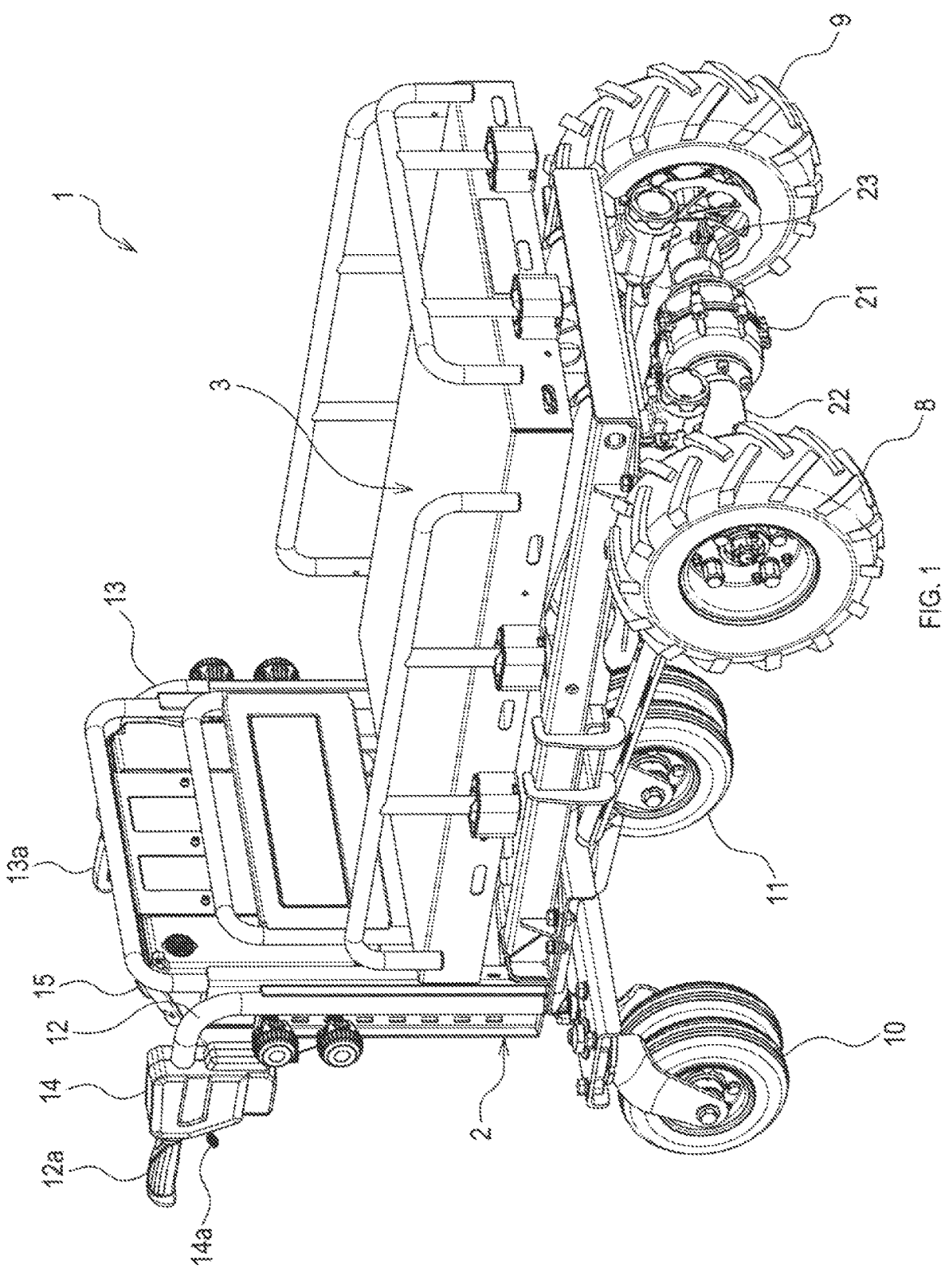
FIG. 1 is a perspective view of a battery-powered wheelbarrow according to an embodiment.

A battery-powered wheelbarrow according to an embodiment may include a handle. The handle may be configured to be gripped by a user of the battery-powered wheelbarrow. The user may use the battery-powered wheelbarrow while standing on a ground where the battery-powered wheelbarrow travels. The user may use the battery-powered wheelbarrow while gripping the handle on a ground where the battery-powered wheelbarrow travels. As used herein, "standing on a ground" includes staying in a specific position without walking around, and also includes walking or running on a ground. Additionally/alternatively, the battery-powered wheelbarrow may include a battery housing. The battery housing may be configured to accommodate a battery therein. The battery may be detachably attached to the battery housing. The battery may be fixed to the battery housing. Additionally/alternatively, the battery-powered wheelbarrow may include a motor. Additionally/alternatively, the motor may include two or more windings and two or more terminals. The two or more terminals may be connected to the two or more windings. Additionally/alternatively, the battery-powered wheelbarrow may include a wheel configured to be driven by the motor. Additionally/ alternatively, the battery-powered wheelbarrow may include a drive circuit. The drive circuit may connect the two or more terminals to the battery in the battery housing so as to drive the motor. The motor may (i) receive an electric power from the battery via the two or more terminals, and also (ii) rotate. Additionally/alternatively, the drive circuit may short-circuit at least two of the two or more terminals so as to activate a dynamic braking in the motor. When at least two of the two or more terminals are short-circuited during rotation of the motor, electric energy generated due to power generation of the motor is consumed inside and/or outside the motor. Such consumption of the electric energy causes the motor to be braked. Additionally/alternatively, the battery-powered wheelbarrow may include a control circuit.

Additionally/alternatively, the control circuit may activate the dynamic braking during a drive requirement of the motor not being satisfied.

Additionally/alternatively, the control circuit may decrease the dynamic braking (or a braking force by the dynamic braking) through the drive circuit in accordance with a lapse of time (or gradually) in response to a first transition having occurred or occurring from the drive requirement not being satisfied to the drive requirement being satisfied. The control circuit may decrease the braking force by the dynamic braking from the braking force at the occurrence of the first transition in response to the first transition occurring. The control circuit may be configured to acquire or calculate a controlled brake variable (or a brake output). The controlled brake variable commands the braking force by the dynamic braking. The control circuit may generate the braking force by the dynamic braking in accordance with the controlled brake variable. By specifying or changing the controlled brake variable, the control circuit may change the braking force by the dynamic braking.

The dynamic braking may be decreased in accordance with a lapse of time in any manner. For example, the dynamic braking may be decreased step wisely or continuously. A stepwise reduction period and a continuous reduction period may be mixed. A rate of decrease (that is, a rate of change) in the braking force may be determined in any manner. The rate of decrease in the braking force may be, for example, constant or variable.

As long as a battery-powered wheelbarrow according to an embodiment includes the aforementioned handle, battery housing, motor, wheel, drive circuit, and control circuit, and also activates the dynamic braking as described above, such battery-powered wheelbarrow can control the dynamic braking properly.

Additionally/alternatively, the control circuit may deactivate the dynamic braking through the drive circuit in response to (i) a first additional requirement being satisfied, and also (ii) the first transition having occurred or occurring. In this case, the control circuit may specify the controlled brake variable such that the dynamic braking is deactivated. In a case where a battery-powered wheelbarrow according to an embodiment includes the aforementioned control circuit, such battery-powered wheelbarrow can deactivate the dynamic braking at an appropriate time point.

The first additional requirement may be satisfied with a rotational speed of the motor (or the number of revolutions per unit time) reaching a first threshold for a first speed threshold). Factors of rotation of the motor typically include, for example, a first factor, a second factor, and a third factor. The first factor is torque produced by the motor itself. The second factor is a rotational force due to inertia (in other words, an inertial force). If the motor stops to produce torque during rotation of the motor, normally the rotation does not stop immediately and the motor continues to rotate by inertia (that is, due to an inertial force). The third factor is an external force applied to the motor. Even if the motor itself does not produce torque, the motor may be passively rotated due to the external force applied thereto. In a case where a battery-powered wheelbarrow according to an embodiment includes the control circuit with the aforementioned features, such battery-powered wheelbarrow exerts the following advantageous effects. That is, when the motor rotates at the first threshold or higher of the rotational speed, for example, owing to the above-described second factor or third factor, and also the establishment of the drive requirement, the battery-powered wheelbarrow can immediately deactivate the dynamic braking through the drive circuit.

Additionally/alternatively, the control circuit may, in response to a second transition having occurred or occurring from the drive requirement being satisfied to the drive requirement not being satisfied, during the motor rotating, increase the dynamic braking in accordance with a lapse of time (or gradually). As used herein, "during rotation of the motor" may include rotation owing to the above-described first factor, second factor, or third factor.

The control circuit may increase the braking force by the dynamic braking from a braking force at occurrence of the second transition. The control circuit may set (or change) the controlled brake variable, thereby increasing, in accordance with a lapse of time, the braking force by the dynamic braking. The control circuit may change a rate of increase in the braking force by the dynamic braking, taking into consideration the rotational speed of the motor. The control circuit may temporarily decrease the braking force depending on its situation, during the braking force being increased. The control circuit may change (increase or decrease) the braking force by the dynamic braking in accordance with the rotational speed of the motor. For example, the rotational speed below the present rotational speed may be set as a target rotational speed for braking. The braking force may be generated in accordance with a difference between the present rotational speed and the target rotational speed for braking. The rotational speed may be decreased as the target rotational speed for braking is decreased in accordance with a lapse of time. The braking force of the dynamic braking is changed in accordance with the rotational speed of the motor as described above, and thereby the braking force of the dynamic braking may increase in accordance with a lapse of time as a result.

Additionally/alternatively, the first additional requirement may be satisfied with (i) the rotational speed of the motor reaching the first threshold, and also (ii) a magnitude (or a braking force) of the dynamic braking being smaller than a preset magnitude (or a preset braking force, or a preset braking force threshold).

In a case where a battery-powered wheelbarrow according to an embodiment includes the control circuit with the aforementioned features, such battery-powered wheelbarrow can reduce a fluctuation in the rotational speed when the state where the drive requirement is satisfied and the state where the drive requirement is not satisfied are switched.

Additionally/alternatively, the control circuit may deactivate the dynamic braking through the drive circuit, in response to the second additional requirement being satisfied after the first transition occurs (or after the drive requirement is satisfied). In this case, the control circuit may set (or change) the controlled brake variable, thereby deactivate the dynamic braking. Deactivating the dynamic braking may include setting the braking force by the dynamic braking to zero. In a ease where a battery-powered wheelbarrow according to an embodiment, includes the aforementioned control circuit, such battery-powered wheelbarrow can deactivate the dynamic braking at an appropriate time point after the drive requirement is satisfied.

Additionally/alternatively, the second additional requirement may be satisfied with a third additional requirement being satisfied. The third additional requirement may be satisfied with the rotational speed of the motor having stayed at a second threshold (or a second speed threshold) or lower for a first preset period of time from a first time point. The first time point may arrive after the first transition occurs. The second threshold may correspond to the rotational speed of zero. The third additional requirement may be satisfied, for example, when the battery-powered wheelbarrow is situated on a flat place or on a gentle slope. In such case, the battery-powered wheelbarrow eliminates or reduces the possibilities of unintendedly accelerating when the dynamic braking is deactivated. Therefore, in a case where a battery-powered wheelbarrow according to an embodiment includes the control circuit with the aforementioned features, such battery-powered wheelbarrow can deactivate the dynamic braking at an appropriate time point in accordance with a situation of the battery-powered wheelbarrow.

Additionally/alternatively, the second additional requirement may be satisfied with the third additional requirement being satisfied after a fourth additional requirement is satisfied. The fourth additional requirement may be satisfied with a second preset period of time elapsing from a second time point after the first transition occurs (or after the drive requirement is satisfied). The first time point may be a time point after the fourth additional requirement is satisfied, in a case where a battery-powered wheelbarrow according to an embodiment includes the control circuit with the aforementioned features, such battery-powered wheelbarrow can properly determine whether the third additional requirement is to be satisfied.

Additionally/alternatively, the control circuit may specify (or set) a rotational direction of the motor. Additionally/alternatively, the control circuit may control the motor via the drive circuit such that the motor rotates in the rotational direction specified (or set). Additionally/alternatively, the second additional requirement may be satisfied with a fifth additional requirement being satisfied. The fifth additional requirement may be satisfied with the motor rotating in a direction opposite to the rotational direction specified. The fifth additional requirement may be satisfied, for example, when the battery-powered wheelbarrow situated on an ascending slope attempts to ascend the ascending slope after the dynamic braking is deactivated. In this case, it can be assumed that the battery-powered wheelbarrow starts moving downward due to gravity as the dynamic braking is decreased. In such a case, it is desirable to control the motor, such that the dynamic braking is deactivated as advance as possible, thereby rotating in the specified rotational direction. Therefore, in a case where a battery-powered wheelbarrow according to an embodiment includes the control circuit with the aforementioned features, such battery-powered wheelbarrow can deactivate the dynamic braking at an appropriate time point in accordance with a situation of the battery-powered wheelbarrow.

Additionally/alternatively, the second additional requirement may be satisfied with the fifth additional requirement being satisfied after a fourth additional requirement is satisfied. In a case where a battery-powered wheelbarrow according to an embodiment includes the control circuit with the aforementioned features, such battery-powered wheelbarrow can properly determine whether the fifth additional requirement is to be satisfied.

Additionally/alternatively, the battery-powered wheelbarrow may include a first manual switch. The first manual switch may be configured to (i) he manually operated by a user of the battery-powered wheelbarrow and (ii) output a first signal to the control circuit in response to the first manual switch having been manually operated or being manually operated. The first signal may request the control circuit, to drive the motor. The drive requirement may he satisfied with the first manual switch having been manually operated or being manually operated. In a case where a battery-powered wheelbarrow according to an embodiment includes the aforementioned first manual switch and the control circuit with the aforementioned features, such battery-powered wheelbarrow allows the user to start, decreasing the dynamic braking at an appropriate time point based on the user's intention to drive a motor.

Additionally/alternatively, the battery-powered wheelbarrow may include a second manual switch configured to be manually operated by the user. Additionally/alternatively, the battery-powered wheelbarrow may include a mechanical brake. The mechanical brake may be configured to directly brake the wheel (or rotation of the wheel) in response to the second manual switch being manually operated. Additionally/alternatively, the drive requirement may be satisfied with (i) the first manual switch having been manually operated or being manually operated, and also (ii) the mechanical brake being deactivated. In a case where a battery-powered wheelbarrow according to an embodiment includes the aforementioned mechanical brake and the control circuit with the aforementioned features, such battery-powered wheelbarrow allows the user to start decreasing the dynamic braking at a more appropriate time point based on the user's intention.

Additionally/alternatively, the battery-powered wheelbarrow may include an electromagnetic brake. The electromagnetic brake may (i) include an electromagnet, and also (ii) be configured to generate a magnetic force via the electromagnet to thereby brake the motor or to release the motor from braking. Additionally/alternatively, the control circuit may activate the electromagnetic brake in response to the drive requirement being not satisfied. In a case where a battery-powered wheelbarrow according to an embodiment includes the aforementioned electromagnetic brake and control circuit, such battery-powered wheelbarrow can properly perform a braking when the drive requirement is not satisfied.

Additionally/alternatively, the control circuit may activate the electromagnetic brake during (i) the drive requirement not being satisfied, and also (ii) the rotational speed of the motor being a third threshold (or a third speed threshold) or lower. The third speed threshold may be any value. The third speed threshold may correspond to, for example, the rotational speed of zero or the rotational speed approximate to zero.

Additionally/alternatively, the control circuit may deactivate the electromagnetic brake in response to the first transition having occurred or occurring (or the drive requirement being satisfied). In a case where a battery-powered wheelbarrow according to an embodiment, includes the aforementioned control circuit, such battery-powered wheelbarrow can avoid an unintended behavior of the battery-powered wheelbarrow immediately after the electro magnetic brake is deactivated.

Additionally/alternatively, the two or more terminals may include a first terminal, a second terminal, and a third terminal. Additionally/alternatively, the drive circuit may be configured to deliver a three-phase electric power to the first terminal, the second terminal, and the third terminal. The control circuit may activate three-phase dynamic braking during the motor being stopped. The three-phase dynamic braking is one type of the dynamic braking. The three-phase dynamic braking may include short-circuiting the first terminal, the second terminal, and the third terminal to each other. In a case where a battery-powered wheelbarrow according to an embodiment includes the aforementioned motor and the control circuit with the aforementioned features, such battery-powered wheelbarrow can increase the braking force by the dynamic braking. The control circuit may continuously or intermittently apply the three-phase dynamic braking when the motor is stopped.

Additionally/alternatively, the control circuit may activate two-phase dynamic braking and/or the three-phase dynamic braking, during rotation of the motor. The two-phase dynamic braking is one type of the dynamic braking. The two-phase dynamic braking may include short-circuiting two terminals of the first terminal, the second terminal, and the third terminal to each other. In a case where a battery-powered wheelbarrow according to an embodiment includes the control circuit with the aforementioned features, such battery-powered wheelbarrow can efficiently control the dynamic braking. For example, during rotation of the motor, the two-phase dynamic braking only may be activated, or the three-phase dynamic braking and the two-phase dynamic braking may be activated while being alternately switched. Alternatively, a period when the three-phase dynamic braking and the two-phase dynamic braking are switched may involve a term of time where no braking is applied.

According to an embodiment, a method of controlling a dynamic braking may be used in a battery-powered wheelbarrow. The method may include activating the dynamic braking to thereby inhibit the battery-powered wheelbarrow from moving. Additionally/alternatively, the method may include decreasing the dynamic braking in accordance with a lapse of time to thereby allow the battery-powered wheelbarrow to move.

In a case where a method according to an embodiment includes all the aforementioned processes, such method can properly control a dynamic braking of the battery-powered wheelbarrow.

In an embodiment, the aforementioned features may be combined in any manner. In an embodiment, one or more features of the aforementioned features may be excluded.

Specific Example Embodiment

(1) Overview of Transportation Cart

Figure 2:
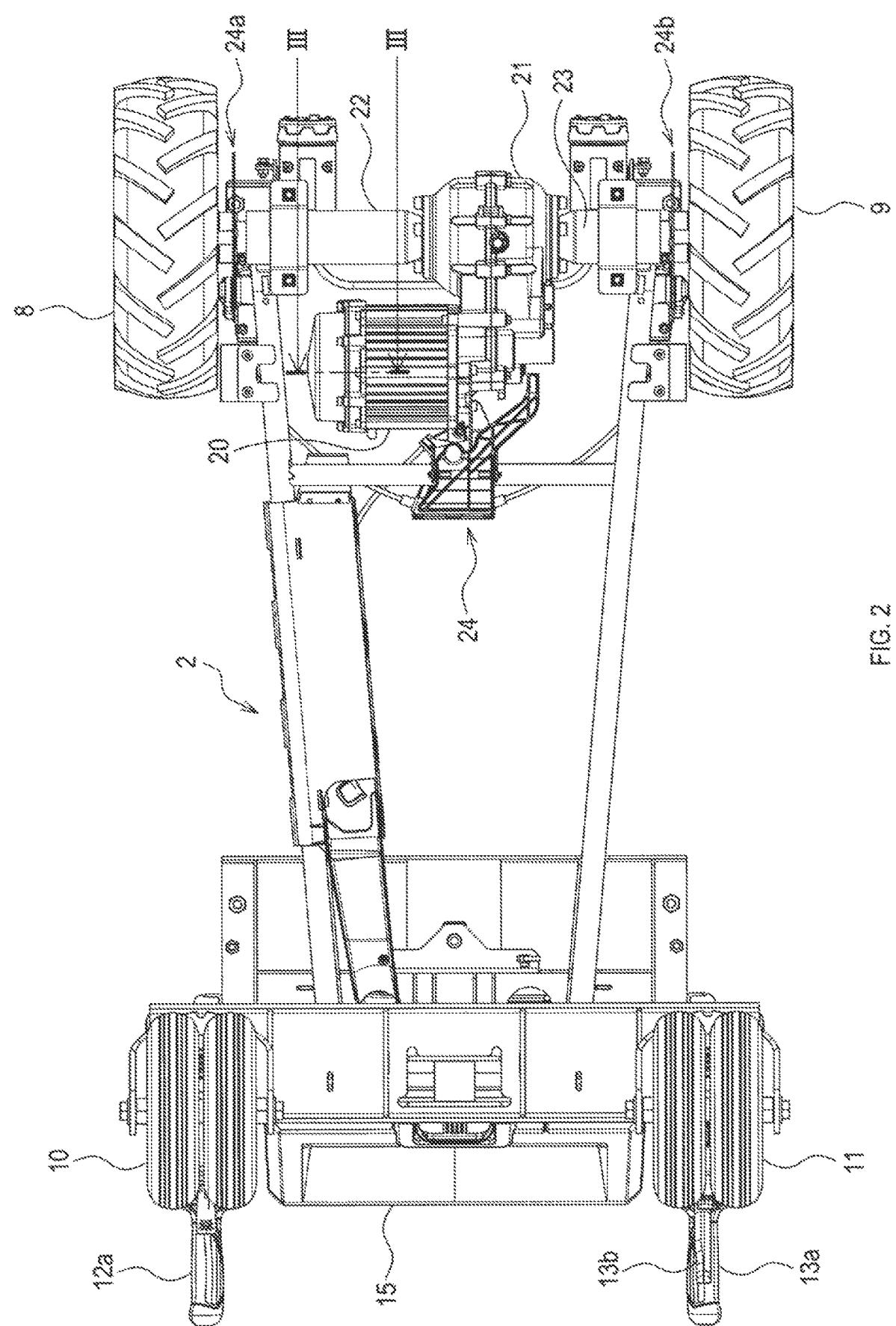
FIG. 2 is a bottom view of the battery-powered wheelbarrow without a platform.

As shown in FIG. 1 and FIG. 2, a battery-powered wheelbarrow 1 in the present embodiment includes a main body 2, one or more front wheels, and one or more rear wheels. In the present embodiment, the one or more front wheels include, for example, two front wheels 8, 9, and the one or more rear wheels are, for example, two rear wheels 10, 11. In other words, the battery-powered wheelbarrow 1 in the present embodiment is embodied as a four-wheeled vehicle.

In in the present embodiment, for example, each of the front wheels 8, 9 corresponds to a driving wheel, and each of the rear wheels 10, 11 corresponds to a driven wheel. The front wheels 8, 9 are driven (that is, rotated) by a motor 25, which will be described below (see FIG. 4).

The main body 2 includes a platform 3 fixed thereto. The platform 3 is detachable from the main body 2. The platform 3 can be loaded with various material. A user of the battery-powered wheelbarrow 1 operates the battery-powered wheelbarrow 1 with the material loaded on the platform 3 to carry the material. The user can selectively fix, to the main body 2, any one platform of two or more types of the platform 3.

Figure 3:
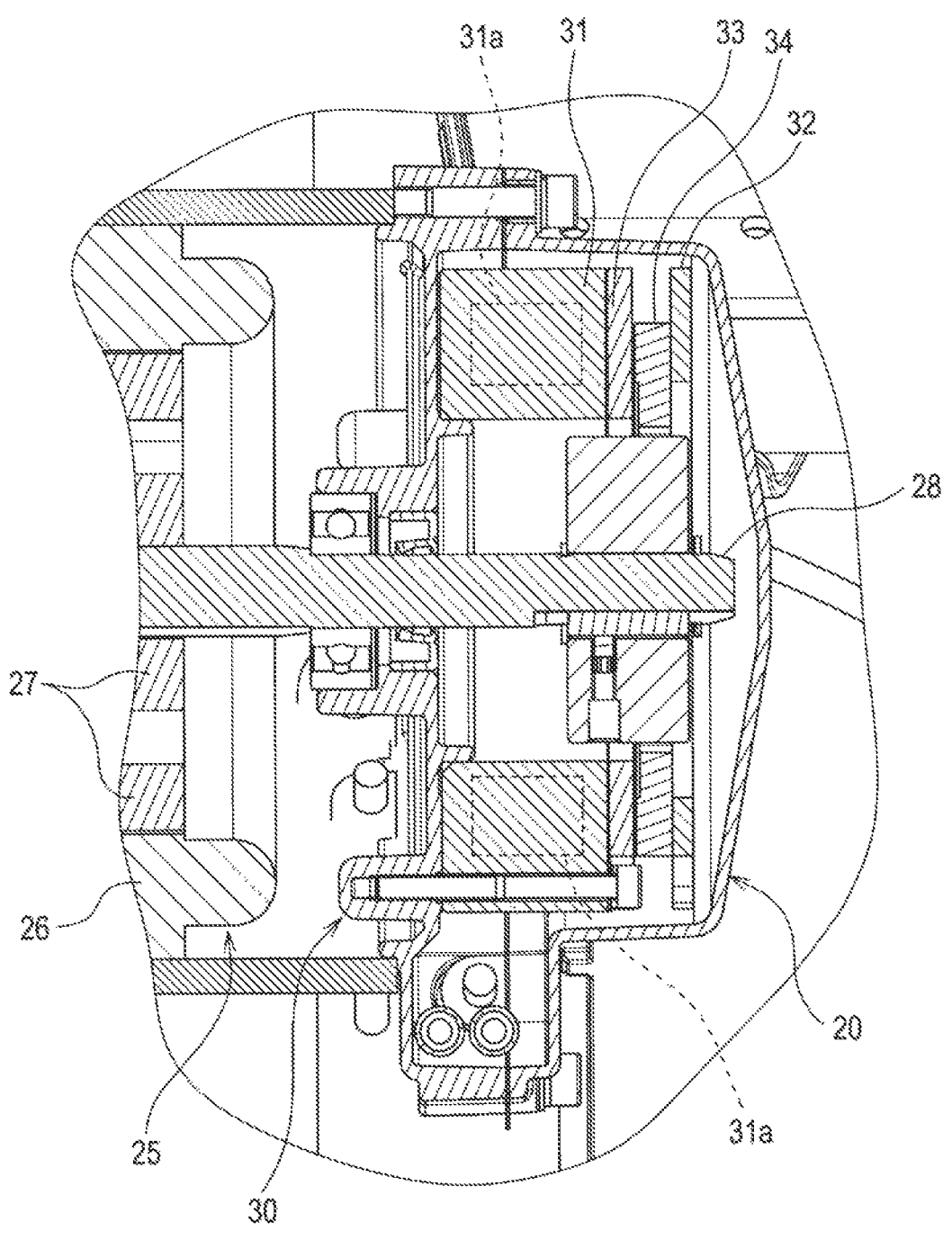
FIG. 3 is a sectional view taking along line III-III in FIG. 2.
Figure 4:
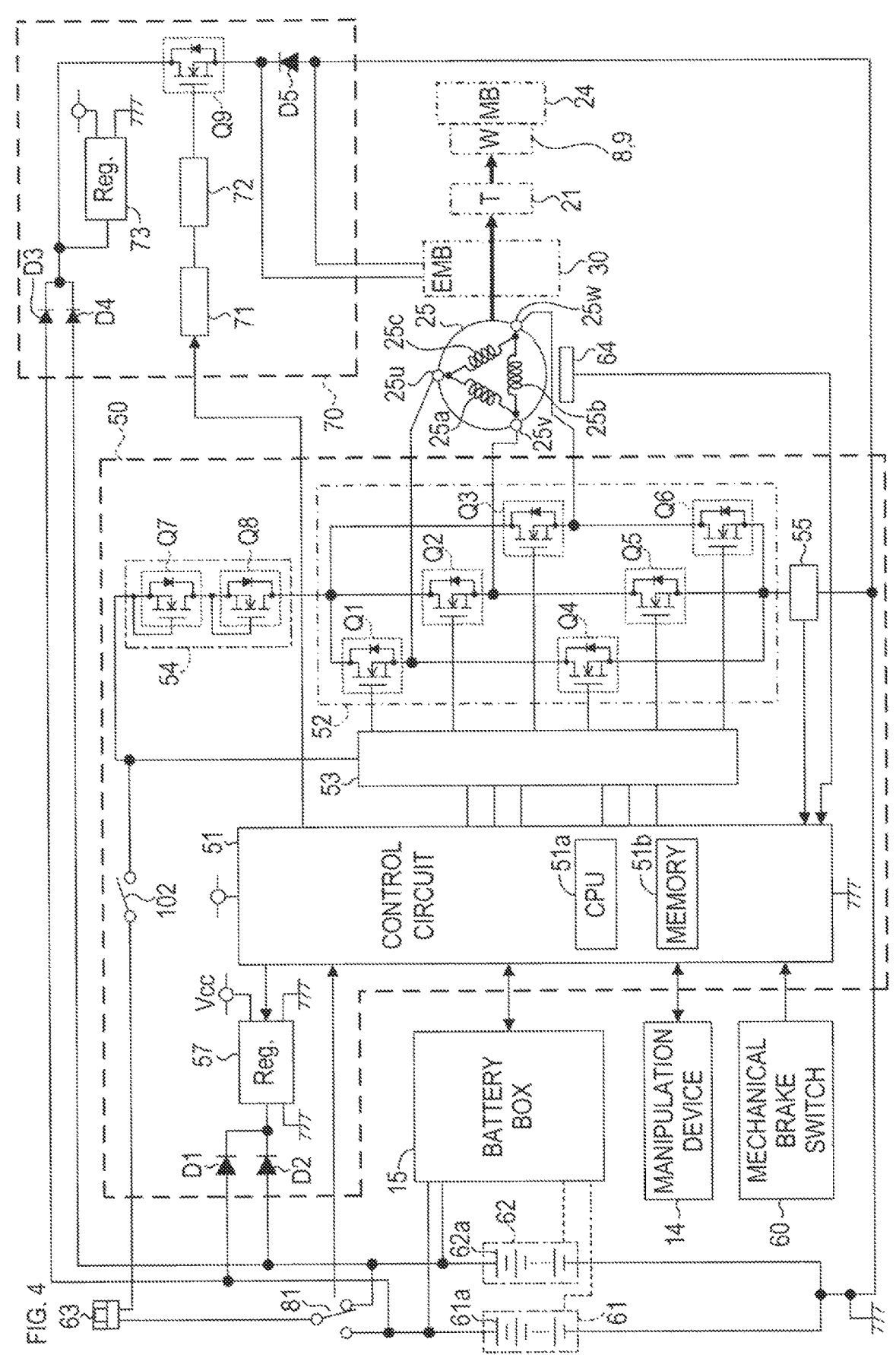
FIG. 4 is a block diagram illustrating a configuration of an electric system of the battery-powered wheelbarrow.

As shown in FIG. 2 and FIG. 3, the battery-powered wheelbarrow 1 further includes a motor device 20. The motor device 20 houses the motor 25 (see FIG. 3 and FIG. 4). As shown in FIG. 3 and FIG. 4, the battery-powered wheelbarrow 1 further includes an electromagnetic brake 30. In the present embodiment, the electromagnetic brake 30 is housed in, for example, the motor device 20.

As shown in FIG. 3, the motor 25 includes a motor stator 26, a motor rotor 27, and a motor shaft 28. The motor rotor 27 includes, for example, a permanent magnet. The motor shaft 28 is fixed to the motor rotor 27. In accordance with rotation of the motor rotor 27, the motor shaft 28 is rotated.

As shown in FIG. 4, the motor 25 further includes a first terminal $25u$, a second terminal $25v$, and a third terminal $25w$. The motor 25 in the present embodiment, is, for example, in a form of a DC brushless motor (or a brushless motor, or a three-phase brushless motor, or a three-phase DC brushless motor). The motor stator 26 includes a first winding $25a$, a second winding $25b$, and a third winding $25c$. The first winding $25a$ to the third winding $25c$ are connected to each other, for example, in a delta connection. The first winding $25a$ to the third winding $25c$ may be connected to each other in any other forms of connection. The first winding $25a$ to the third winding $25c$ may be connected to each other, for example, in a star (or wye) connection.

The first winding $25a$ to the third winding $25c$ are electrically connected to the first terminal $25u$ to third terminal $25w$. An electric power is supplied, via the first terminal $25u$ to third terminal $25w$, to the first winding $25a$ to third winding to $25c$, thereby rotating the motor rotor 27 (and thus, rotating the motor shaft 28). Such rotation of the motor shaft 28 is transmitted to a transmission mechanism 21. In the present embodiment, the term "rotation" of the motor 25 specifically means that the motor shaft 28 rotates.

The battery-powered wheelbarrow 1 further includes the transmission mechanism 21. The transmission mechanism 21 transmits a rotational force of the motor 25 to the front wheels 8, 9. More specifically, the transmission mechanism 21 transmits the rotational force of the motor 25 to the front wheel 8 via a right drive shaft 22, and also to the front wheel 9 via a left drive shaft 23. The transmission mechanism 21 may include, for example, a differential gear.

As shown in FIG. 2, the battery-powered wheelbarrow 1 further includes a mechanical brake 24. The mechanical brake 24 brakes the front wheels 8, 9 due to a friction force. In the present embodiment, the mechanical brake 24 includes, for example, a right disk brake $24a$ and a left disk brake $24b$. The right disk brake $24a$ brakes the front wheel 8. That is, the right disk brake $24a$ includes two brake pads and a brake disk that rotates integrally with the front wheel 8. The left disk brake $24b$ includes two brake pads and a brake disk that rotates integrally with the front wheel 9. When the mechanical brake 24 is activated, each brake disk is pressed by the respective brake pads, and thereby the front wheels 8, 9 are brakes.

As shown in FIG. 3, the electromagnetic brake 30 in the present embodiment includes, for example, a brake stator 31, a brake plate 32, an armature 33, and a brake rotor 34. The brake stator 31 includes an electromagnetic coil $31a$ inside. The brake stator 31 and the brake plate 32 are fixed in the motor device 20.

The brake rotor 34 is fixed to the motor shaft 28. As the motor shaft 28 rotates, the brake rotor 34 also rotates. The armature 33 is elastically supported to be movable along a direction perpendicular to a rotational surface of the brake rotor 34 (that is, a direction parallel to an axial direction of the motor shaft 28).

In response to the electromagnetic brake 30 being turned ON (that is, activated), the armature 33 moves toward the brake plate 32. This causes the brake rotor 34 to be squeezed by the armature 33 and the brake plate 32, thereby braking the brake rotor 34 (or rotation of the brake rotor 34). In other words, rotation of the motor shaft 28 is braked.

In response to the electromagnetic brake 30 being turned OFF (that is, deactivated or released), the armature 33 moves away from the brake plate 32. Accordingly, the brake rotor 34 does not contact the armature 33 and the brake plate 32, resulting in o application of the braking force of the electromagnetic brake 30 to the motor shaft 28.

In the present embodiment, for example, in response to an electric power supply to the electromagnetic coil 31*a*, the electromagnetic coil 31*a* works as an electromagnet. This causes the electromagnetic brake 30 to be turned OFF, thus canceling the braking force. On the other hand, when the electric power supply to the electromagnetic coil 31*a* is interrupted, the electromagnetic brake 30 is turned ON, resulting in generation of the braking force.

In the present embodiment, the battery-powered wheelbarrow 1 may he braked by the above-described mechanical brake 24 and/or electromagnetic brake 30. The battery-powered wheelbarrow 1 in the present embodiment may be further braked by dynamic braking. The dynamic braking includes three-phase dynamic braking and two-phase dynamic braking.

The three-phase dynamic braking corresponds to short-circuiting the first terminal 25*u* to third terminal 25*w* of the motor 25 to each other.

The two-phase dynamic braking corresponds to short-circuiting any two terminals of the first, terminal 25*u* to third terminal 25*w* to each other. In the two-phase dynamic braking, the two terminals to be short-circuited are determined based on one or more specific windings. The one or more specific windings correspond to one or more windings with an induced voltage generated due to rotation of the motor rotor 27, out of the first winding 25*a* to the third winding 25*c*. The two-phase dynamic braking includes short-circuiting two terminals such that electric current based on the induced voltage flows through the one or more specific windings (and thus, an electromagnetic action between the electric current and the motor rotor 21 leads to generation of a damping torque in the motor rotor 27). The electric current based on the induced voltage that flows from the one or more specific windings via two terminals is, hereinafter, referred to as "two-phase short-circuit current".

A braking force of the three-phase dynamic braking is greater than that of the two-phase dynamic braking. The braking force of the two-phase dynamic braking can be controlled by adjusting a time required for short-circuiting two terminals, in other words, adjusting an effective value of the two-phase short-circuit current.

The main body 2 includes a right handle bar 12 and a left handle bar 13. Each of the right handle bar 12 and the left handle bar 13 has a bar-shape with, for example, a curve like L-shape. The right handle bar 12 is provided with a right grip 12*a* at its first end. The left handle bar 13 is provided with a left grip 13*a* at its first end. For example, the right grip 12*a* is gripped by a right hand of the user, and the left grip 13*a* is gripped by a left hand of the user.

The main body 2 includes a brake lever 13*b*. The brake lever 13*b* is provided, for example, on the left handle bar 13 near the left grip 13*a*. For example, the user can manually move (or manually operate) (for example, pull) the brake lever 13*b* with the left hand while gripping the left grip 13*a* with the left hand. The brake lever 13*b* is manually moved to activate the mechanical brake 24, thereby applying a braking force by the mechanical brake 24 to the front wheels 8, 9. The braking force by the mechanical brake 24 varies depending on a position of the brake lever 13*b*.

The main body 2 includes a manipulation device 14. The manipulation device 14 is provided, for example, on the right, handle bar 12 near the right grip 12*a*. An electrical configuration of the manipulation device 14 will be described below with reference to FIG. 5A.

The main body 2 includes a drive lever 14*a*. In the present embodiment, the drive lever 14*a* is provided, for example, on the manipulation device 14. For example, the user can manually move (or manually operate) (for example, pull) the drive lever 14*a* (for example, pulling manipulation) with the right hand while gripping the right grip 12*a* with the right hand.

The main body 2 includes a battery box 15. The battery box 15 is arranged, for example, between the right handle bar 12 and the left handle bar 13. Two or more battery packs are detachably attached to the battery box 15. For example, a first battery pack 61 and a second battery pack 62 (see FIG. 4) are attached to the battery box 15 in the present embodiment. The electrical configuration, except for the battery box 15, will be described below with reference to FIG. 5B.

The user pushes or pulls the battery-powered wheelbarrow 1 by himself/herself to rotate the front wheels 8, 9 and the rear wheels 10, 11, thereby allowing the battery-powered wheelbarrow 1 to travel. Further, the user manipulates the drive lever 14*a* to drive the front wheels 8, 9 by the motor 25, thereby allowing the battery-powered wheelbarrow 1 to travel.

(2) Electrical Configuration of Electric Transportation Cart

As shown in FIG. 4, the battery-powered wheelbarrow 1 includes a first controller 50. The first controller 50 controls driving of the motor 25. The battery-powered wheelbarrow 1 further includes a second controller 70. The second controller 70 controls the electromagnetic brake 30.

The first controller 50 includes a control circuit 51. The control circuit 51 of the present embodiment is, for example, in the form, of a microcomputer including a central processing unit (CPU) 51*a* and a memory 51*b*. For example, the memory 51*b* may include a semiconductor memory such as a Read-Only Memory (ROM), a Random-Access Memory (RAM), a Nonvolatile RAM (NVRAM), or a flash memory.

The control circuit 51 achieves various functions by executing a program stored in a non-transitory tangible storage medium. In the present embodiment, the memory 51*b* corresponds to the non-transitory tangible storage medium storing the program. In the present embodiment, the memory 51*b* stores a program for a main process (see FIG. 6) that will be described below.

Some or all of the functions implemented by the control circuit 51 may be achieved by executing a program (that is, by software processing), or may be achieved by one or some hardware. For example, the control circuit 51 may include a logic circuit, including two or more electronic components, instead of or addition to the microcomputer. The control circuit 51 may include an integrated circuit (IC) for a particular use, such as an Application Specific integrated Circuit (ASIC) or an Application Specific Standard Product (ASSP), or include a programmable logic device that can be programmed to create any desired circuit, for example, a Field Programmable Gate Array (FPGA).

FIG. 4 shows an example state where both the first battery pack 61 and the second battery pack 62, which are described above, are attached to the battery box 15. Each of the first battery pack 61 and the second battery pack 62 functions as a power source for the battery-powered wheelbarrow 1. The first battery pack 61 includes a first battery 61a. The second battery pack 62 includes a second battery 62a. The first battery 61a and/or the second battery 62a may be, for example, a rechargeable battery.

The battery-powered wheelbarrow 1 includes a battery selector switch 81. In the present embodiment, the battery selector switch 81 is disposed, for example, on the battery box 15. In response to the battery selector switch 81 being manually moved by the user, one of the first battery pack 61 and second battery pack 62 is set as a power source for the motor 25. The battery selector switch 81 outputs a battery selector switch signal to the control circuit 51. The battery selector switch signal Indicates a battery pack selected by the battery selector switch 81.

The battery-powered wheelbarrow 1 includes a key slot 63. The key slot 63 is connected to the battery selector switch 81 and to the first controller 50 (in particular, to a trigger switch 102, which will be described below). The key slot 63 is configured to permit a key to be removably inserted thereinto.

The insertion of the key into the key slot 63 causes the battery selector switch 81 and the first controller 50 to be electrically interconnected via the key slot 63. In this case, an electric power from the power source selected by the battery selector switch 81 is inputted to the first controller 50 via the battery selector switch 81 and the key slot 63. This electric power is hereinafter referred to as "motor drive power".

When the key is not inserted in the key slot 63, the key slot 63 interrupts electrical connection between the battery selector switch 81 and the first controller 50. In this case, the motor drive power is not inputted to the first controller 50. It is to be noted that the following will be described, assuming that the key is inserted into the key slot 63, that is, the battery-powered wheelbarrowl is in a state in which the first controller 50 can receive the motor drive power.

The first controller 50 includes a first gate circuit 53. The control circuit 51 outputs motor control signals to the first gate circuit 53. The motor control signals are used for controlling rotation of the motor 25. In the present embodiment, the motor control signals include, for example, a pulse-width modulation signal (PWM signal). During the trigger switch 102 being turned ON, the first gate circuit 53 receives the motor drive power via the trigger switch 102. The first gate circuit 53 creates drive signals, using the motor drive power, corresponding to the motor control signals. The drive signals are created, for example, by boosting the motor control signals using the motor drive power.

The first controller 50 includes a drive circuit 52. The drive signals created by the first gate circuit 53 are inputted to the drive circuit 52. The drive circuit 52 receives the motor drive power via the trigger switch 102. More specifically, the first controller 50 in the present embodiment includes a regeneration-reduction circuit 54. The drive circuit 52 receives the motor drive power via the trigger switch 102 and the regeneration-reduction circuit 54.

The drive circuit 52 is connected to the first terminal 25u to the third terminal 25w in the motor 25. The drive circuit 52 generates, from the motor drive power, a three-phase drive power tor driving the motor 25. The drive circuit 52 supplies the generated the three-phase drive power to the motor 25 (in particular, the first terminal 25u to the third terminal 25w).

The drive circuit 52 in the present embodiment includes a three-phase full-bridge circuit. The three-phase full-bridge circuit includes a first switching device Q1, a second switching device Q2, a third switching device Q3, a fourth switching device Q4, a fifth, switching device Q5, and a sixth switching device Q6. Each of the first to sixth switching devices Q1-Q6 may be in any form. In the present embodiment, each of the first to Sixth switching devices Q1-Q6 is in a form of, for example, an n-channel metal oxide semiconductor field-effect transistor (MOSFET).

The drive signals outputted from the first gate circuit 53 are respectively inputted to the first to sixth switching devices Q1-Q6. The first to sixth switching devices Q1-Q6 are turned ON or OFF in accordance with the respective drive signals. The motor control signals in the present embodiment include a PWM signal, as described above. When each of the first to sixth switching devices Q1-Q6 receives the corresponding drive signal based on the PWM signal, it is periodically turned ON in accordance with a duty ratio of the corresponding drive signal (that is, a duty ratio of the corresponding motor control signal).

The above-described three-phase dynamic braking is activated, for example, by turning ON three low-side switches while turning OFF three high-side switches. The three low-side switches correspond to the fourth to sixth switching devices Q4-Q6. The three high-side switches correspond to the first switching device Q1 to the third switching device Q3.

The above-described two-phase dynamic braking is activated, for example, by turning ON any two of the fourth to sixth switching devices Q4-Q6 while turning OFF the four switching devices other than the two. The two switching devices to be turned ON for the two-phase dynamic braking are determined so as to allow the above-described two-phase short-circuit current to flow through the two switching devices.

The regeneration-reduction circuit 54 is provided in a supply path of the motor drive power from the trigger switch 102 to the drive circuit 52. The regeneration-reduction circuit 54 avoids regenerative current from flowing into a selected battery from the motor 25 via the drive circuit 52. The selected battery corresponds to either the first battery pack 61 or the second battery pack 62, which is selected by the battery selector switch 81.

The regeneration-reduction circuit 54 in the present embodiment includes two switching devices Q7, Q8 that are coupled in series. The switching devices Q7, Q8 are in a form of, for example, an n-channel MOSFET. The switching device Q7 has a gate short-circuited to a source of the switching device Q7. The switching device Q8 has a gate that is short-circuited to a source of the switching device Q8. Each of the switching devices Q7, Q8 includes a parasitic diode. The parasitic diodes inhibit regenerative current from the motor 25.

The first controller 50 includes a current detection circuit 55. The current detection circuit 55 detects a value of electric current flowing through the motor 25 (hereinafter, referred to as "motor current value"). The current detection circuit 55 outputs an electric current detection signal to the control circuit 51. The electric current detection signal includes information indicating the motor current value. The current detection circuit 55 in the present embodiment is arranged between the drive circuit 52 and a ground line. The ground line is connected to negative electrodes of the first batteries 61a and the second battery 62a.

As shown in FIG. 4, the motor 25 includes a rotation sensor 64. The rotation sensor 64 outputs a rotation detection signal to the first controller 50 (in particular, the control circuit 51). The rotation detection signal indicates a rotational position of the motor 25. The rotation sensor 64 in the present embodiment includes, for example, a Hall sensor. The rotation detection signal includes a pulse signal. The rotation sensor 64 outputs the pulse signal every time when the motor 25 is turned at a certain angle. The control circuit 51 can detect that the motor 25 is rotating, in response to receipt of the pulse signal. Further, the control circuit 51 can detect, based on pulse signal receiving intervals, a rotational speed of the motor 25 (hereinafter, referred to as "motor rotational speed"). The motor rotational speed may be the number of revolutions of the motor 25 per unit time. The control circuit 51 can detect, based on changes in a time point of receiving the pulse signal, a rotational direction of the motor 25.

As shown in FIG. 4, the battery-powered wheelbarrow 1 includes a mechanical brake switch 60. The mechanical brake switch 60 is turned ON or OFF in conjunction with the brake lever 13b. Specifically, the mechanical brake switch 60 is turned ON during the brake lever 13b being manually moved. The mechanical brake switch 60 outputs a mechanical brake switch signal to the control circuit 51. The mechanical brake switch signal indicates whether the mechanical brake switch 60 is turned ON.

As shown in FIG. 4, the battery-powered wheelbarrow 1 includes the above-described manipulation device 14. The manipulation device 14 is electrically connected to the first controller 50 (in particular, the control circuit 51). The battery-powered wheelbarrow 1 includes the above-described battery box 15. The battery box 15 is electrically connected to the first controller 50 (in particular, the control circuit 51). Further, the battery box 15 is electrically connected to the first battery pack 61 and to the second battery pack 62.

Figure 5A:
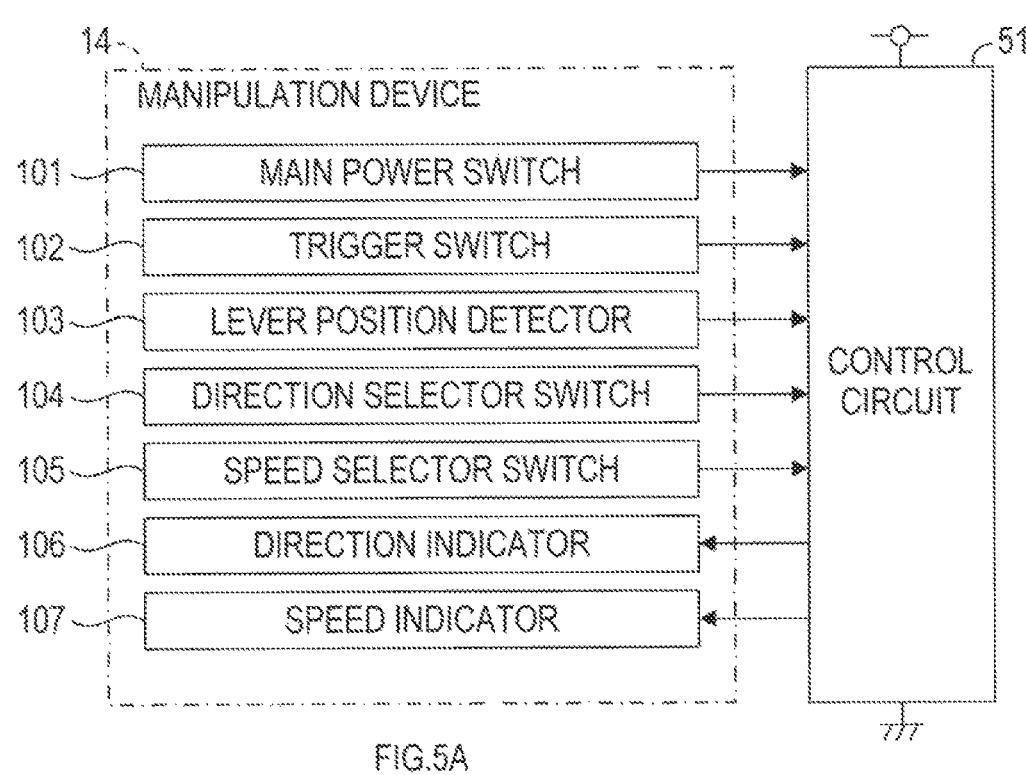
FIG. 5A is a block diagram of an electric system of a manipulation device in more detail.

The manipulation device 14 will be specifically described with reference to FIG. 5A. The manipulation device 14 includes a main power switch 101. The main power switch 101 is configured to be manually turned ON (for example, pressed-down) by the user. The main power switch 101, may be, for example, a tactile switch. The main power switch 101 outputs a main power switch signal to the control circuit 51. The main power switch signal indicates whether the main power switch 101 is turned ON.

The manipulation device 14 includes the trigger Switch 102. The trigger switch 102 is turned ON or OFF in conjunction with the drive lever 14a. Specifically, the trigger switch 102 remains ON during the drive lever 14a being manually moved. The trigger switch 302 outputs a trigger switch signal to the control circuit 51. The trigger switch signal indicates whether the trigger switch 102 is turned ON. The trigger switch 302 in FIG. 4 is illustrated within broken lines indicating the first controller 50, for convenience of the description.

The manipulation device 14 includes a lever position detector 103. The lever position detector 103 detects a position (or a moved length or a moved distance) of the drive lever 14a. The lever position detector 103 outputs a position signal to the control circuit 51. The position signal indicates the position of the drive lever 14a detected by the lever position detector 103.

The manipulation device 14 includes a direction selector switch 104. The direction selector switch 104 is configured to be manually turned ON (for example, pressed-down) by the user. The direction selector switch 104 specifics, as a moving direction of the battery-powered wheelbarrow 1, either forward or rearward directions where the battery-powered wheelbarrow 1 travels. The direction selector switch 104 outputs a direction selector switch signal to the control circuit 51. The direction selector switch signal indicates whether the direction selector switch 104 is turned ON. The control circuit 51 alternately switches the moving direction of the battery-powered wheelbarrow 1 (in particular, the rotational direction of the motor 25) every time the direction selector switch 104 is turned ON (in particular, every time the direction selector switch 104 is switched from OFF to ON). Hereinafter, the rotational direction of the motor 25 to be specified by the control circuit 51 in response to the direction selector switch signal is referred to as a "specific rotational direction".

The manipulation device 14 includes a direction indicator 106. The control circuit 51 outputs, to the direction indicator 106, a direction display signal indicating the specified moving direction. In accordance with the direction display signal received from the control circuit 51, the direction indicator 106 displays the moving direction of the battery-powered wheelbarrow 1.

The manipulation device 14 includes a speed selector switch 105. The speed selector switch 105 is manually turned ON (for example, pressed-down) by the user. The speed selector switch 105 specifies one of two or more modes as a speed mode of the motor 25. In the present embodiment, one of, for example, a high-speed mode, a medium-speed mode, and a low-speed mode is specified as the speed mode. The speed selector switch 105 outputs a speed selector signal to the control circuit 51. The speed selector signal indicates whether the speed selector switch 105 is turned ON. The control circuit 51 sequentially switches a speed mode every time the speed selector switch 105 is tuned ON (in particular, the speed selector switch 105 is switched from OFF to ON).

The manipulation device 14 includes a speed indicator 107. The control circuit 51 outputs a speed display signal to the speed indicator 107. The speed display signal indicates the specified speed mode. In accordance with the speed display signal inputted from the control circuit 51, the speed indicator 107 displays the speed mode of the battery-powered wheelbarrow 1.

Figure 5B:
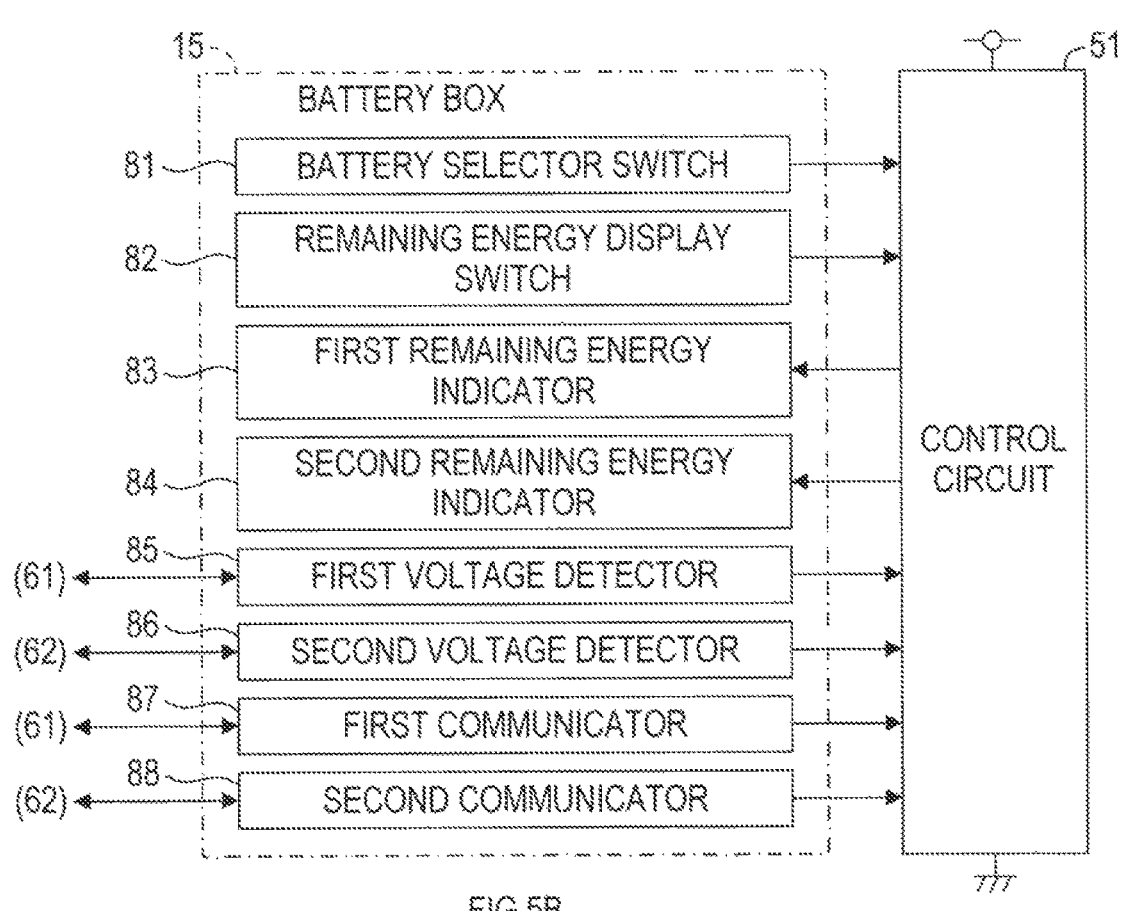
FIG. 5B is a block diagram of an electric system and the like of a battery box in more detail.

The battery box 15 will be specifically described with reference to FIG. 5B. The battery box 15 includes the above-described battery selector switch 81.

Further, the battery box 15 includes a remaining energy display switch 82. The control circuit 51 is configured to detect remaining energy of each electric power of the first battery 61a and the second battery 62a. The remaining energy display switch 82 is manually turned ON (for example, pressed-down) by the user. The remaining energy display switch 82 instructs the control circuit 51 to display the remaining energy of each of the first battery 61a and the second battery 62a. The remaining energy display switch 82 outputs the remaining energy display switch signal to the control circuit 51. The remaining energy display switch signal indicates whether the remaining energy display switch 82 is turned ON.

The battery box 15 includes a first remitting energy indicator 83 and a second remaining energy indicator 84. The control circuit 51 displays the remaining energy of the first battery 61a on the first remaining energy indicator 83, and the remaining energy of the second battery 62a is displayed at a second remaining energy indicator 84 every time the control circuit 51 identifies, based on the remaining energy display switch signal, that the remaining energy display switch 82 is turned ON.

The battery box 15 includes a first voltage detector 85. The first voltage detector 85 detects a voltage of the first battery 61a (hereinafter, referred to as "output voltage V1"). The first voltage detector 85 outputs a first voltage signal to the control circuit 51. The first voltage signal includes information indicating the output voltage V1.

The battery box 15 includes a second voltage detector 86. The second voltage detector 86 detects a voltage of the second battery 62a (hereinafter, referred to as "output voltage V2"). The second voltage detector 86 outputs a second voltage signal to the control circuit 51. The second voltage signal includes information indicating the output voltage V2.

The battery box 15 includes a first communicator 87. The first communicator 87 relays communication between the first battery pack 61 and the control circuit 51. The first communicator 87 outputs first communication information to the control circuit 51. The first communication information indicates data received from the first battery pack 61.

The battery box 15 includes a second communicator 88. The second communicator 88 relays communication between the second battery pack 62 and the control circuit 51. The second communicator 88 outputs second communication information to the control circuit 51. The second communication information indicates data received from the second battery pack 62.

As shown in FIG. 4, the first controller 50 includes a first regulator 57. The first regulator 57 receives the output voltage V1 through a first diode D1. The first regulator 57 further receives the output voltage V2 through a second diode D2.

The first regulator 57 generates a first control voltage Vc1 based on the output voltage V1 and/or output voltage V2. The first control voltage Vc1 is supplied to the control circuit 51 and nearby circuit(s).

The first regulator 57 receives a power source control signal from the control circuit 51. The power source control signal indicates ON or OFF. In response to receiving the power source control signal indicating ON, the first regulator 57 generates the first control voltage Vc1. In response to receiving the power source control signal indicating OFF, the first regulator 57 stops generation of the first control voltage Vc1. Accordingly, the control circuit 51 outputs the first control voltage Vc1 indicating OFF, thereby stopping to output the first control voltage Vc1 front the first regulator 57. This can stop operation of the control circuit 51.

In response to receiving an activation-trigger during generation of the first control voltage Vc1 being stopped, the first regulator 57 generates the first control voltage Vc1. The activation-trigger includes, for example, turning ON the main power switch 101 and/or turning ON the remaining energy display switch 82. Generation of a power supply voltage Vcc due to the activation-trigger causes the control circuit 51 to be activated.

The second controller 70 receives the output voltage V1 and/or the output voltage V2. The second controller 70 is connected to the control circuit 51 and to the electromagnetic brake 30.

The second controller 70 includes a switching device Q9. The switching device Q9 in the present embodiment is in a form of, for example, an n-channel MOSFET. The switching device Q9 has a drain receiving the output voltage V1 and/or the output voltage V2. The switching device Q9 has a source connected to the electromagnetic brake 30. More specifically, the source of the switching device Q9 is connected to a first end of the electromagnetic coil 31a in the electromagnetic brake 30. A second end of the electromagnetic coil 31a is connected to the ground line. The second controller 70 further includes a fifth diode D5. An anode of the fifth diode D5 is connected to the ground line. A cathode of the fifth diode D5 is connected to the source of the switching device Q9.

While the switching device Q9 is turned ON, the output voltage V1 and/or the output voltage V2 is outputted to the electromagnetic brake 30 via the switching device Q9. This causes the electromagnetic brake 30 to be turned OFF (that is, deactivated), thereby releasing the motor 25 from braking provided by the electromagnetic brake 30. While the switching device Q9 is OFF, the output voltage V1 and the output voltage V2 are not outputted to the electromagnetic brake 30. In this ease, the electromagnetic brake 30 is turned ON (that is, activated), so that the motor 25 is braked by the electromagnetic brake 30.

The second controller 70 includes a signal determination circuit 71. The signal determination circuit 71 receives an electromagnetic brake control signal from the control circuit 51. In the present embodiment, the electromagnetic brake control signal is in a form of, for example, a binary signal. That is, the electromagnetic brake control signal indicates whether the electromagnetic brake 30 should be turned ON or OFF. The signal determination circuit 71 determines which one of ON and OFF is indicated by the electromagnetic brake control signal, and outputs a determination signal indicating its determination result.

The second controller 70 includes a second gate circuit 72. The second gate circuit 72 receives the determination signal from the signal determination circuit 71. In accordance with the determination signal, the second gate circuit 72 turns ON or OFF the switching device Q9. Specifically, when the determination signal indicates that the electromagnetic brake 30 is turned ON, the second gate circuit 72 turns OFF the switching device Q9 to activate the electromagnetic brake 30. On the other hand, when the determination signal indicates that the electromagnetic brake 30 is turned OFF, the second gate circuit 72 turns ON the switching device Q9 to deactivate the electromagnetic brake 30 (or to release the braking by the electromagnetic brake 30).

The second controller 70 includes a second regulator 73. The second regulator 73 receives the output voltage V1 via a third diode D3. The second regulator 73 further receives the output voltage V2 via a fourth diode D4.

The second regulator 73 generates a second control voltage Vc2 front the output voltage V1 and/or the output voltage V2. The second control voltage Vc2 is supplied to the signal determination circuit 71 and the second gate circuit 72.

FIG. 4 schematically shows that the rotational force of the motor 25 is transmitted to the front wheels 8, 9 via the transmission mechanism 21. In addition, FIG. 4 schematically shows that the rotation of the motor 25 can be braked by the electromagnetic brake 30, and rotation of the from wheels 8, 9 can be braked by the mechanical brake 24.

(3) Overview of Motor Control

The following will describe an overview of a control method of controlling the motor 25 by the control circuit 51.

The control circuit 51 in the present embodiment includes, for example, five control modes. The control circuit 51 sets the control circuit 51 to one mode of the five control modes. The five control modes include an initial mode, a standby mode, a first brake mode, a second brake mode, and a drive mode. Hereinafter, the term "brake mode" means the first brake mode and/or the second brake mode.

If the battery-powered wheelbarrow 1 is stopped and also a motor drive requirement is not satisfied, the control circuit 51 basically sets the control mode to the standby mode. The motor drive requirement to be satisfied is not limited. In the present embodiment, the motor drive requirement is satisfied, for example, in response to the trigger switch 102 being turned ON and also the mechanical brake switch 60 being turned OFF. In other words, the motor drive requirement is satisfied, for example, in response to the drive lever 14*a* being manually moved and also the brake fever 13*b* being not manually moved. Alternatively, the motor drive requirement may be satisfied, for example, in response to the trigger switch 102 being turned ON. Still alternatively, the motor drive requirement may be satisfied, for example, in response to three or more requirements being or having been simultaneously satisfied. The three or more requirements may include a requirement where the trigger switch 102 is turned ON, and a requirement where the mechanical brake switch 60 is turned OFF.

The control circuit 51 that is set to the standby mode turns ON the electromagnetic brake 30, and activates the three-phase dynamic braking. That is, the control circuit 51 activates the three-phase dynamic braking to brake the motor 25.

During the battery-powered wheelbarrow 1 traveling (that is, during rotation of the motor 25), the control circuit 51 may set the control mode to the standby mode. In this case, the control circuit 51 turns OFF the electromagnetic brake 30 and activates two-phase dynamic braking.

In the standby mode, the control circuit 51 sets the control mode from the standby mode to the brake mode in response to the motor drive requirement being satisfied. In the brake mode, the control circuit 51 turns OFF the electromagnetic brake 30 and switch the dynamic braking to the two-phase dynamic braking. Further, the control circuit 51 decreases the two-phase dynamic braking (or the braking force of the two-phase dynamic braking) in accordance with a lapse of time (gradually, continuously, or step wisely). In other words, although the electromagnetic brake 30 is turned OFF, the dynamic braking remains, and thus braking applied to the battery-powered wheelbarrow 1 is not immediately released. Therefore, when the battery-powered wheelbarrow 1 situated, for example, on a descending slope, the battery-powered wheelbarrow 1 is inhibited from accelerating in a downward direction due to gravity.

During the battery-powered wheelbarrow 1 traveling, a re-trigger may be performed by the user. The re-trigger means to temporarily deactivate to manually move the drive lever 14*a*, and then reactivate to manually move the drive lever 14*a*. When the re-trigger is performed during the battery-powered wheelbarrow 1 traveling, it is desirable to quickly deactivate the dynamic braking. Therefore, in the present embodiment, the control circuit 51 deactivates the dynamic braking quickly, when the motor drive requirement is satisfied and if a first additional requirement (described below) is satisfied. Specifically, the control circuit 51 immediately switches the control mode to the drive mode, thereby quickly deactivating the dynamic braking. In this case, the control circuit 51 may switch the control mode to the drive mode without switching the control mode from the standby mode to the brake mode. The control circuit 51 may switch the control mode to the drive mode quickly after temporarily setting the control mode to the brake mode. This can avoid reducing the usability (restarting performance) of the user when the re-trigger is performed.

The control circuit 51 that is set to the drive mode supplies the three-phase drive power to the motor 25, thereby driving the motor 25. In the drive mode, the control circuit 51 monitors the motor rotational speed and controls the motor 25 such that the motor rotational speed is consistent with a target rotational speed. The control circuit 51 may monitor the motor current value in addition to the motor rotational speed, and may control the motor 25 based on its monitoring result. The control circuit 51 may switch the control mode from the drive mode to the brake mode based on the monitoring result.

The first additional requirement may be satisfied in any desired case. In the present embodiment, the first additional requirement is satisfied in accordance with, for example, the motor rotational speed being, for example, a first speed threshold R1 or higher and also a controlled brake variable being a variable threshold M1 (%) or lower. The first speed threshold R1 corresponds to an example of a first threshold.

The controlled brake variable is a determining factor in the braking force of the two-phase dynamic braking. In the present embodiment, the controlled brake variable may range, for example, from 0% to 100%. The control circuit 51 calculates the controlled brake variable based on the motor rotational speed, a brake target speed (or brake command rotational speed) (described below), and the like. The control circuit 51 deactivates the two-phase dynamic braking based on the calculated controlled brake variable. When the controlled brake variable is 0%, the control circuit 51 zeros the braking force of the two-phase dynamic braking. That is, in this case, the control circuit 51 does not allow the two-phase dynamic braking. When the controlled brake variable is 100%, the control circuit 51 maximizes the braking force of the two-phase dynamic braking. The control circuit 51 activates the two-phase dynamic braking such that the braking force of the two-phase dynamic braking is greater as the controlled brake variable is greater.

The braking force in accordance with the variable threshold M1 corresponds to one example of a preset braking force of the overview. The variable threshold M1 may be set to any value. The variable threshold M1 may be set to an optional value, for example, 50% or less. The variable threshold M1 may be set to, for example, 25%.

The control circuit 51 that is set to the brake mode sets the control mode to the drive mode in response to a second additional requirement being satisfied. The second additional requirement may be satisfied in any desired case. In the present embodiment, the second additional requirement is satisfied, for example, in response to a requirement A being satisfied, and thereafter additionally, a requirement B or a requirement C being satisfied.

The requirement A corresponds to one example of a fourth additional requirement of the overview. The requirement A is satisfied in response of a lapse of a waiting time Ta from a determination start time. The determination start time is a time point after the motor drive requirement is satisfied, that is, after the control mode is switched from the standby mode to the brake mode. The determination start time corresponds to one example of a second time point of the overview. The waiting time Ta corresponds to one example of a second preset period of time of the overview. The determination start time may be set to any time point. The determination start time may be determined as a time point, for example, when the drive requirement is satisfied, when the control mode is set to the brake mode, when the electromagnetic brake 30 is turned ON, or when an initial first deactivating determination process (details of which will be described below and see FIG. 9) is started after transition from the standby mode to the brake mode.

The requirement B corresponds to one example of a third additional requirement of the overview. The requirement B is satisfied with the motor rotational speed continuously being kept at a second speed threshold R2 or lower in a period of a speed determination time Tb from a measurement start time. The measurement start time it a time point after the requirement A is satisfied. The second speed threshold R2 corresponds to an example of a second threshold. The measurement start time corresponds to one example of a first time point of the overview, the speed determination time Tb corresponds to one example of a first preset period of time of the overview. The second speed threshold R2 may be set to any value. The second speed threshold R2 may correspond to, for example, the rotational speed of zero. The measurement start time may be set to any time point. The measurement start time may be, for example, an initial time point when the requirement A is satisfied after transition from the standby mode to the brake mode.

The requirement C corresponds to one example of a fifth additional requirement of the overview. The requirement C is satisfied with the motor 25 rotating in a direction opposite to the specific rotational direction. The requirement C may be satisfied, for example, when the battery-powered wheelbarrow 1 at a standstill (i.e., without moving) on an ascending slope. Specifically, the requirement C may be satisfied when the battery-powered wheelbarrow 1 descends due to gravity in response to the drive lever 14a manually moved.

During the drive mode, if the motor drive requirement is not satisfied because of, for example, cancellation of manipulation of the drive lever 14a, the control circuit 51 switches the control mode to the standby mode. In this case, the control circuit 51 gradually increases the two-phase dynamic braking (or the braking force of the two-phase dynamic braking), thereby decelerating the battery-powered wheelbarrow 1. When the rotation of the motor 25 is then stopped, the control circuit 51 activates the electromagnetic brake 30 and the three-phase dynamic braking.

(4) Main Control Process

To achieve the aforementioned control of the motor 25, a main control process executed by the control circuit 51 (more specifically, the CPU 51a) will be described with reference to FIG. 6. The control circuit 51 is activated to execute a main process.

The control circuit 51 starts the main process to determine, in S110, whether a control cycle (or control period, or control cycle length) elapses. The control cycle may be preset, for example. If the control cycle does not elapse (S110: NO), the control circuit 51 repeats the process in S110 until the control cycle elapses. If the control cycle elapses (S110: YES), the control circuit 51 executes a switch information acquisition process in S120.

In the switch information acquisition process, the control circuit 51 acquires, for example, various signals inputted to the control circuit 51 from various switches such as the trigger switch 102, the mechanical brake switch 60, the main power switch 101, the speed selector switch 105, the direction selector switch 104, and the battery selector switch 81. The various signals acquired in S120 include the position signal to be inputted from the lever position detector 103.

When completing the switch information acquisition process, the control circuit 51 executes a power source control process in S130. In the power source control process, the control circuit 51 sets the power source control signal to be turned ON or OFF based on the main power switch signal acquired in S120. Specifically, when the main power switch 101 is turned ON while the power source control signal is set to be turned OFF, the control circuit 51 sets the power source control signal to be turned ON. When the main power switch 101 is turned ON while the power source control signal is set to be turned ON, the control circuit 51 sets the power source control signal to be turned OFF.

When completing the power source control process, the control circuit 51 executes a battery information acquisition process in S140. In the battery information acquisition process, the control circuit 51 acquires a first voltage signal from the first voltage detector 85 and a second voltage signal from the second voltage detector 85. The control circuit 51 further acquires first communication information from the first communicator 87 and second communication information from the second communicator 88 in the battery information acquisition process.

Figure 7:
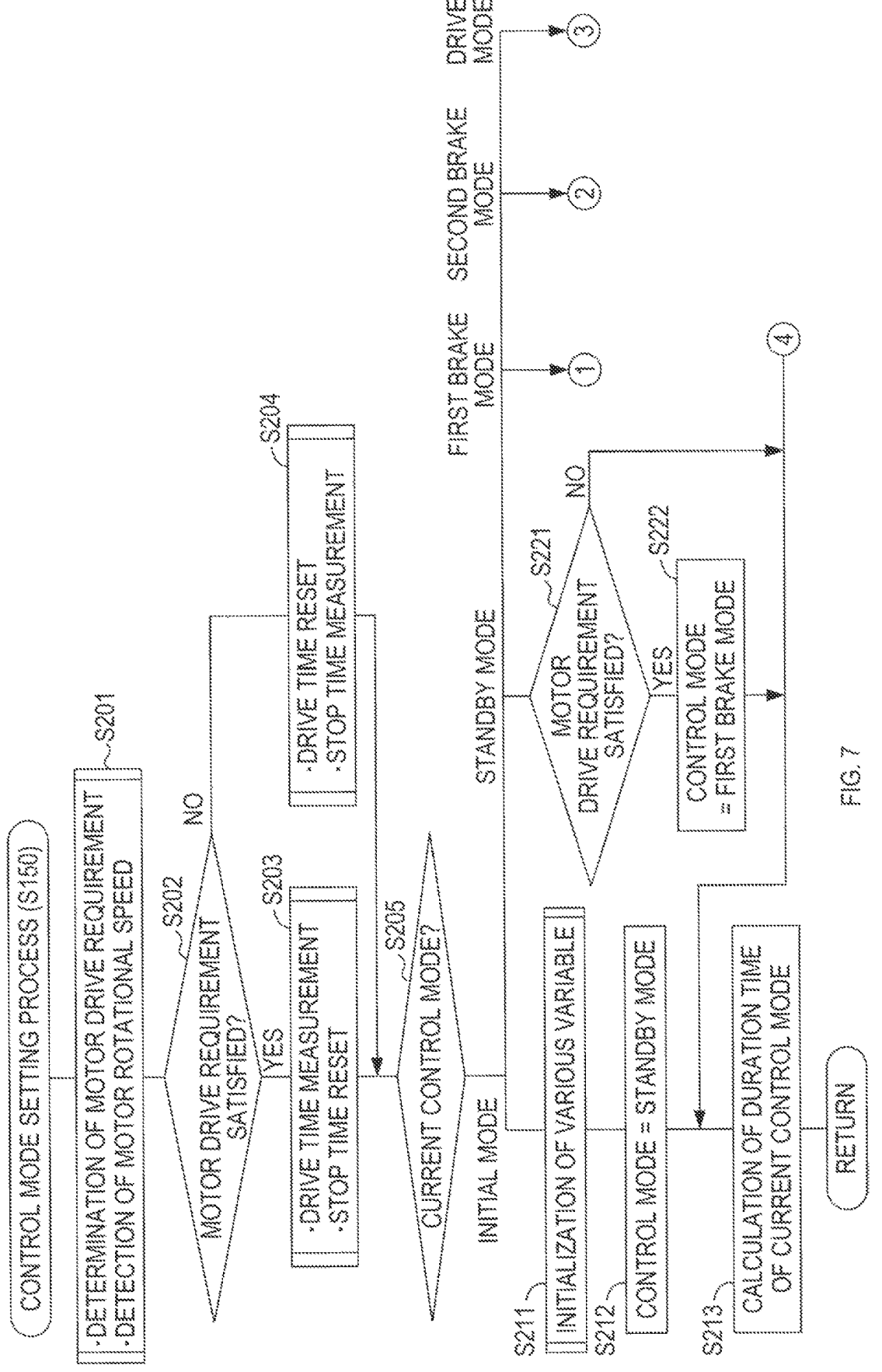
FIG. 7 is a flowchart of one part of a control mode setting process.

When completing the battery information acquisition process, the control circuit 51 executes a control mode setting process in S150. Details of the control mode setting process are shown in FIG. 7. The control circuit 51 starts the control mode setting process to determine the motor drive requirement in S201. In addition, the control circuit 51 detects the motor rotational speed. In a period of the present control cycle, the determination result of the motor drive requirement and the motor rotational speed that are acquired in S201 is used in each process after S201.

In S202, the control circuit 51 determines whether the motor drive requirement is satisfied. If the motor drive requirement is satisfied (S202: YES), the control circuit 51, in S203, starts to measure a drive time and resets a stop time. If measurement of the drive time has been already started, such measurement is continued. If the motor drive requirement is not satisfied (S202: NO), the control circuit 51 resets the drive time in S204 and starts to measure the stop time. If measurement of the stop time has been already started, such measurement is continued.

When completing the process of S203 or S204, the control circuit 51 determines the present control mode in S205. In an initial state immediately after the main control process starts, the control mode is, for example, the initial mode. If the present control mode is the initial mode, the control circuit 51 initializes in S211 various variables used for controlling of the motor 25. The various variables include various flags (described below), permission or non-permission of a brake deactivating (described below), the speed mode, the specific rotational direction, and the brake target speed. In S211, the control circuit 51 executes to, for example, (i) clear the various flags, (ii) provide non-permission of the brake deactivating, (iii) set the speed mode to a low-speed mode, (iv) set a specific rotational direction to a first direction (a direction where the battery-powered wheelbarrow 1 moves forward), and also (v) set the brake target speed to zero.

In S212, the control circuit 51 sets the control mode to the standby mode. In S213, the control circuit 51 calculates a duration time of the control mode that is currently set. After the process in S213, the present process proceeds to S160 (see FIG. 6).

If the present control mode is the standby mode in S205, the control circuit 51 executes a process in S221. In S221, the control circuit 51 determines whether the motor drive requirement is satisfied, as in S202. If the motor drive requirement is satisfied (S221: YES), the control circuit 51 sets the control mode to the first brake mode in S222. In other words, if the motor drive requirement is satisfied, the control circuit 51 proceeds to the first brake mode without proceeding to the drive mode immediately, in order to maintain a state in which the dynamic braking is being activated. After the process in S222, the control circuit 51 executes a process in S213. If the motor drive requirement is not satisfied in S221, (S221: NO), the control circuit 51 proceeds to the process in S213.

Figure 8:
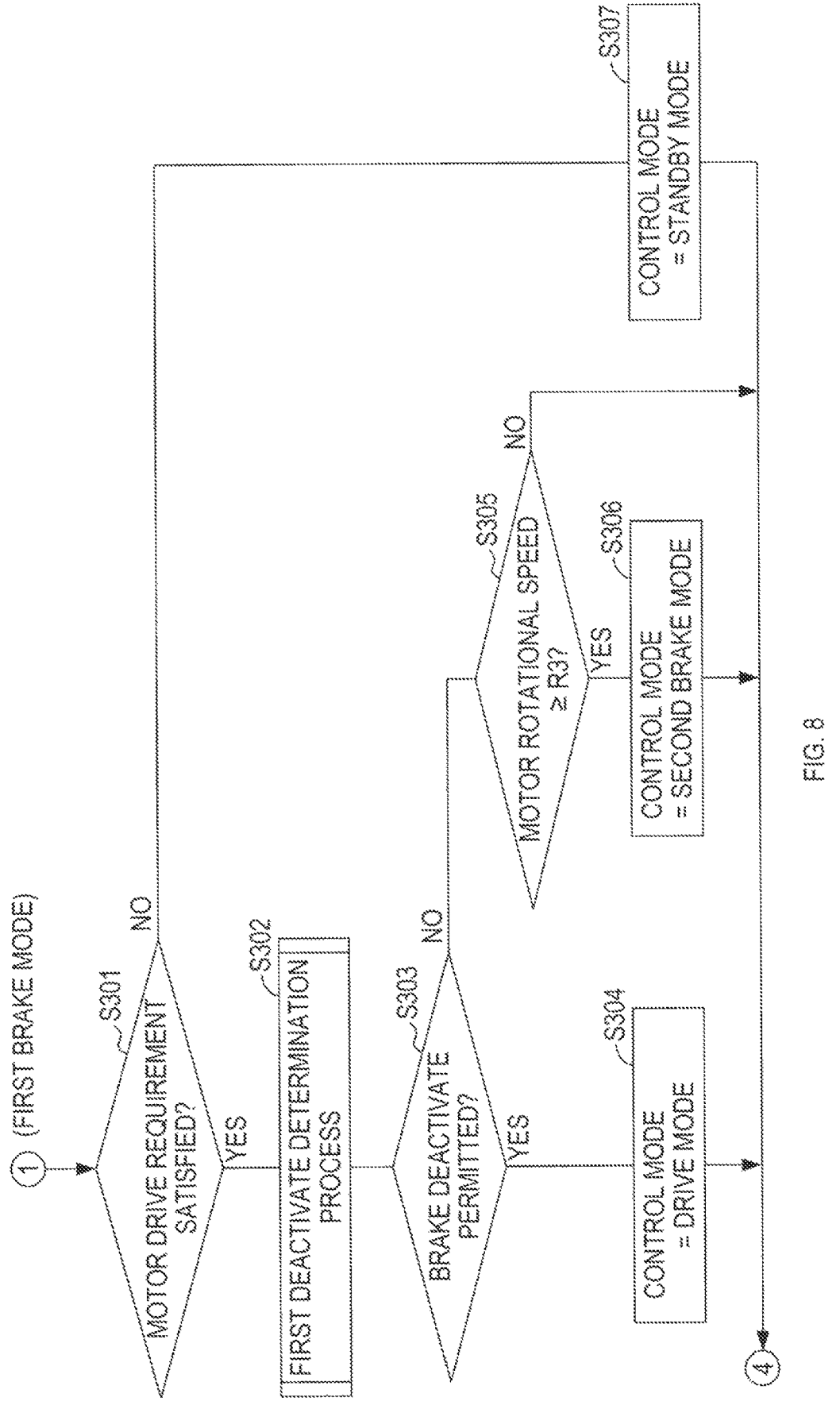
FIG. 8 is a flowchart of another part of the control mode setting process.

If the present control mode is the first brake mode in S205, the control circuit 51 executes a process in S301 shown in FIG. 8. In S301, the control circuit 51 determines whether the motor drive requirement is satisfied, as in S202. If the motor drive requirement is not satisfied (S301: NO), the control circuit 51 sets the control mode to the standby mode in S307. When completing the process in S307, the control circuit 51 proceeds to the process in S213 (see FIG. 7).

Figure 9:
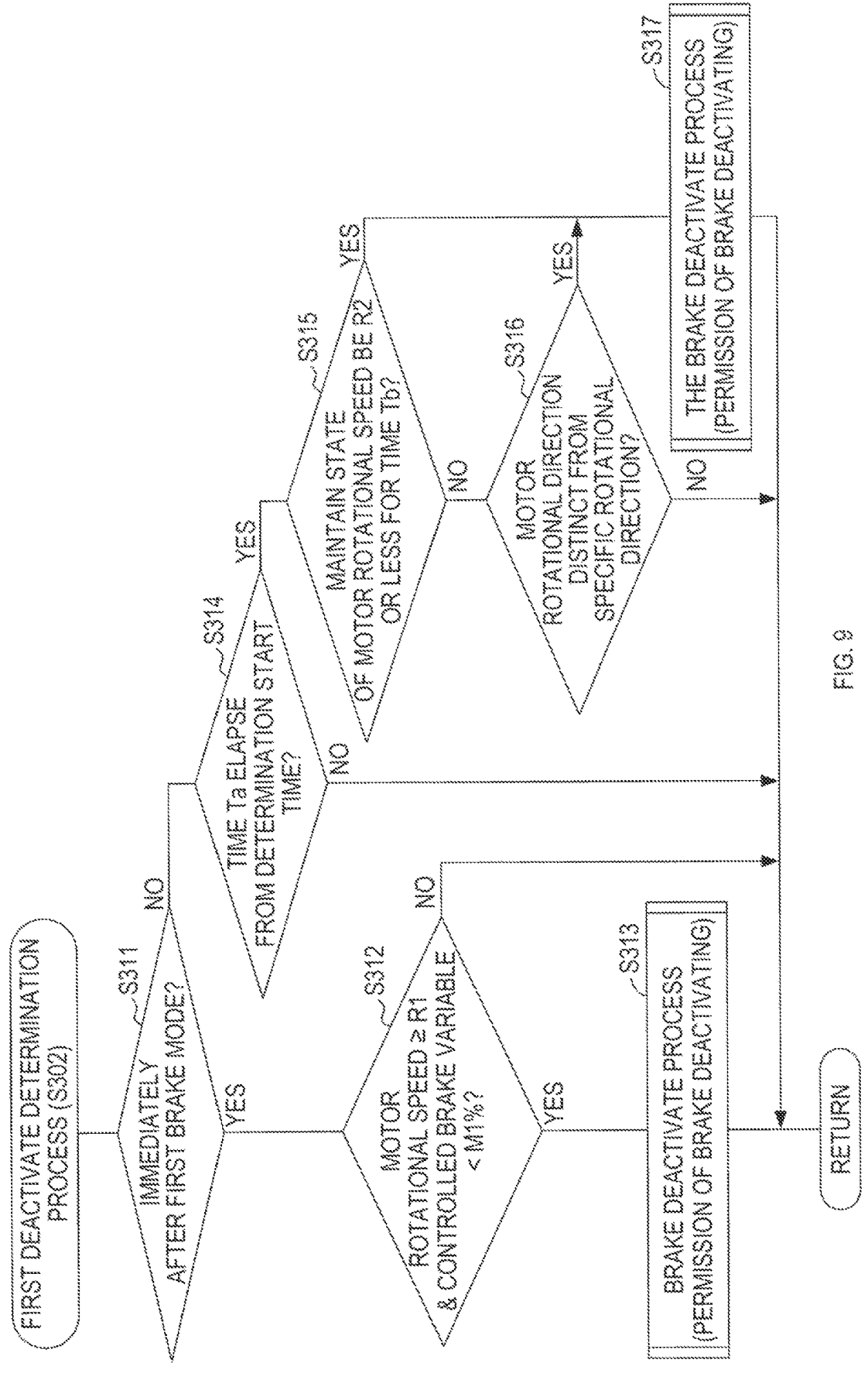
FIG. 9 is a flowchart of a first deactivating determination process.

If the motor drive requirement is satisfied in S301 (S301: YES), the control circuit 51 executes a first deactivating determination process in S302. The first deactivating determination process includes determining whether to allow the dynamic braking to be deactivated. Details of the first deactivating determination process are shown in FIG. 9.

Proceeding to the first deactivating determination process, the control circuit 51 determines in S311 whether a present time point is immediately after transition to the first brake mode, in other words, the control circuit 51 determines whether to be currently executing an initial first deactivating determination process after transition from the standby mode to the first brake mode.

If the currently executing first deactivating determination process is an initial first deactivating determination process after transition from the standby mode to the first brake mode (S311: YES), the control circuit 51 executes the process in S312. In S312, the control circuit 51 determines whether (i) the motor rotational speed is the first speed threshold R1 or higher, and also (ii) the currently calculating controlled brake variable is below the variable threshold M1. In other words, the control circuit 51 determines whether the above-described first additional requirement is satisfied.

If (i) the motor rotational speed is the first speed threshold R1 or higher and also (ii) the currently calculating controlled brake variable is below the variable threshold M1 (that is, the first additional requirement is satisfied) (S312: YES), the control circuit 51 executes a brake deactivating process in S313. Specifically, the control circuit 51 permits the brake deactivating. Herein, the term "brake deactivating" means to deactivate the dynamic braking. After the process in S313, the control circuit 51 proceeds to the process in S303 (see FIG. 8).

In S312, if (i) the motor rotational speed is below the first speed threshold R1, and/or (ii) the currently calculating controlled brake variable is the variable threshold M1 or higher (S312: NO), the control circuit 51 proceeds to the process in S303 without permitting the brake deactivating.

In S311, if the present time point is not immediately after the transition to the first brake mode, that is, the control circuit 51 is currently executing a second and subsequent first deactivating determination process after transition from the standby mode to the first brake mode (S311: NO), the control circuit 51 proceeds to a process in S314.

In S314, the control circuit 51 determines whether the above-described waiting time Ta elapses from the above-described determination start time. In other words, the control circuit 51 determines whether the above-described requirement A is satisfied. One purpose of the process in S314 is, for example, to avoid executing the processes in S315 and S316 in a transition period of time immediately after transition from the standby mode to the first brake mode.

If the waiting time Ta does not elapse from the determination start time (that is, the requirement A is not satisfied) (S314: NO), the control circuit 51 ends the present first deactivating determination process and proceeds to the process in S303 (see FIG. 8).

If the waiting time Ta elapses from the determination start time (that is, the requirement A is satisfied) (S314: YES), the control circuit 51 executes the process in S315. In S315, the control circuit 51 determines whether the motor rotational speed is kept at the second speed threshold R2 or lower in the period of the speed determination time Tb. In other words, the control circuit 51 determines whether the above-described requirement B is satisfied.

In S315, more specifically, the control circuit 51 determines whether the motor rotational speed is the second speed threshold R2 or lower in the period of the speed determination time Tb from the measurement start time. The measurement start time may be, for example, an initial time point when the requirement A is determined to have been satisfied in S314 after transition from the standby mode to the first brake mode.

If the motor rotational speed is kept at the second speed threshold R2 or lower in the period of the speed determination time Tb (that is, the requirement B is satisfied) (S335: YES), the control circuit 51 executes the process in S317. In S317, the control circuit 51 executes the brake deactivating process as in S313. When the brake deactivating process is complete, the control circuit 51 proceeds to the process in S303 (see FIG. 8). Based on establishment of the requirement B in S315, it can be assumed that, for example, the battery-powered wheelbarrow 1 is situated on a flat place and, thus the motor 25 rotates at a very low speed or does not rotate.

If the motor rotational speed is not kept at the second speed threshold R2 or lower in the period of the speed determination time Tb (that is, the requirement B is not satisfied) (S315: NO), the control circuit 51 executes the process in S316. In S316, the control circuit 51 determines whether a present rotational direction of the motor 25 is different from the specific rotational direction. In other words, the control circuit 51 determines whether the above-described requirement C is satisfied.

If the present rotational direction of the motor 25 matches the specific rotational direction (that is, the requirement C is not satisfied) (S316: NO), the control circuit 55 proceeds to the process in S303 (see FIG. 8). If the present rotational direction of the motor 25 is different from the specific rotational direction (that is, the requirement C is satisfied) (S316: YES), the control circuit 51 executes the brake deactivating process in S317.

With reference back to FIG. 8, a further description is given. When the first deactivating determination process in S302 is complete, the control circuit 51 executes the process in S303. In S303, the control circuit 51 determines whether the brake deactivating is permitted. If the brake deactivating is permitted (S303: YES), the control circuit 51 sets the control mode to the drive mode in S304. When completing the process in S304, the control circuit 51 proceeds to the process in S213 (see FIG. 7).

If the brake deactivating is not permitted in S303 (S303: NO), the control circuit 51 executes the process in S305. In S305, the control circuit 51 determines whether the motor rotational speed is a third speed threshold R3 or higher. The third speed threshold R3 exceeds, for example, the first speed threshold R1. The second speed threshold R2 may be, for example, a value of zero as described above. The second speed threshold R2 may be, for example, (i) greater than zero, and also (ii) below both of the first speed threshold R1 and the third speed threshold R3.

If the motor rotational speed is below the third speed threshold R3 in S305 (S305: NO), the control circuit 51 proceeds to the process in S213 (see FIG. 7), with maintaining the first brake mode. If the motor rotational speed is the third speed threshold R3 or higher (S305: YES), the control circuit 51 executes the process in S306. In S306, the control circuit 51 sets the control mode to the second brake mode. When completing the process in S306, the control circuit 51 proceeds to the process in S213 (see FIG. 7).

Figure 10:
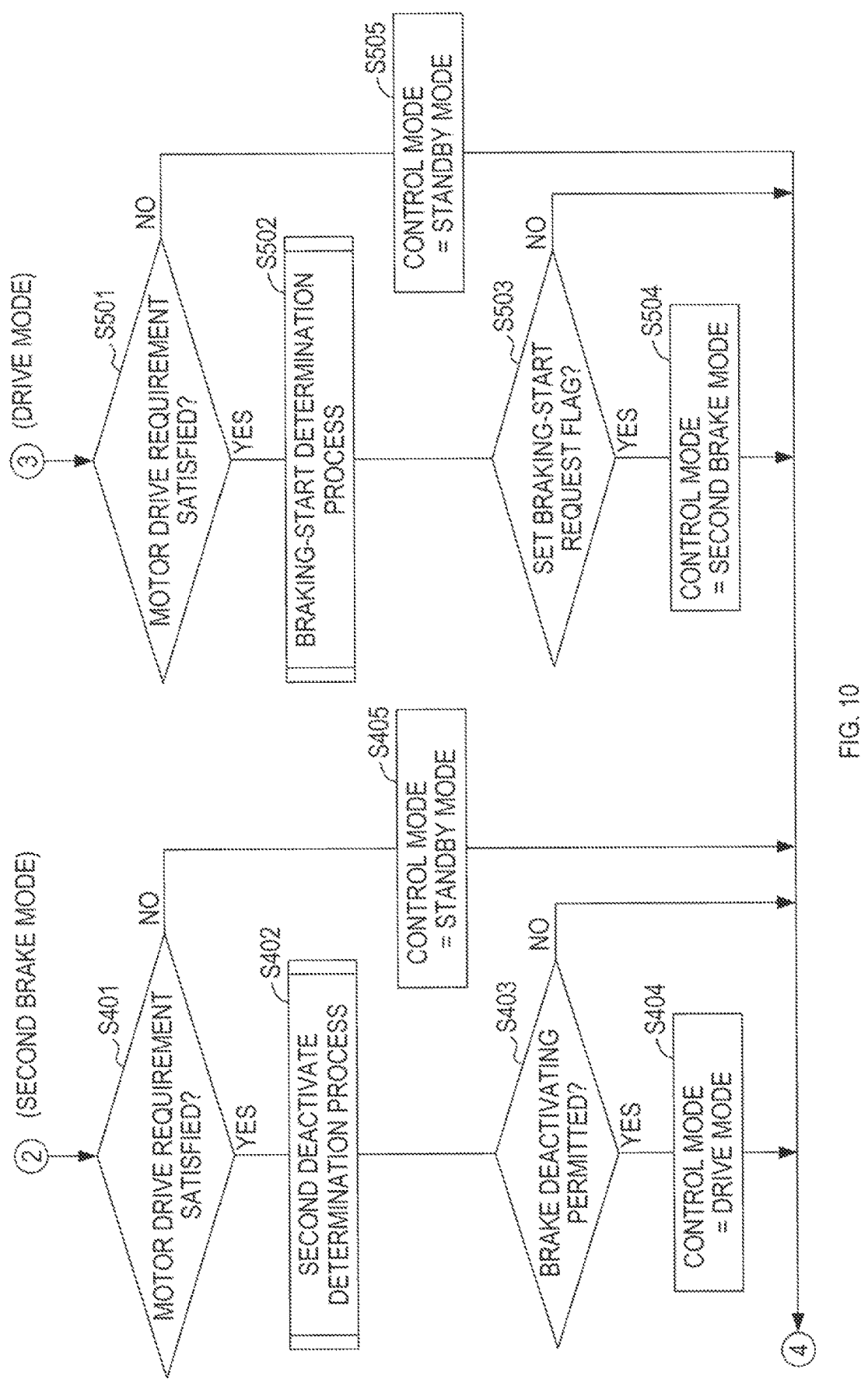
FIG. 10 is a flowchart of still another of the control mode setting process.

If the present control mode is set to the second brake mode in S205 (see FIG. 7), the control circuit 51 executes the process in S401 shown in FIG. 10. Based on the fact that the control mode is set to the second brake mode, it can be assumed that, for example, the battery-powered wheelbarrow 1 is moving downward on a descending slope with the braking force of the two-phase dynamic braking being controlled.

In S401, the control circuit 51 determines whether the motor drive requirement is satisfied, as in S202. If the motor drive requirement is not satisfied (S401: NO), the control circuit 51 sets the control mode to the standby mode in S405. When completing the process in S405, the control circuit 51 proceeds to the process in S213 (see FIG. 7).

Figures 11A, 11B:
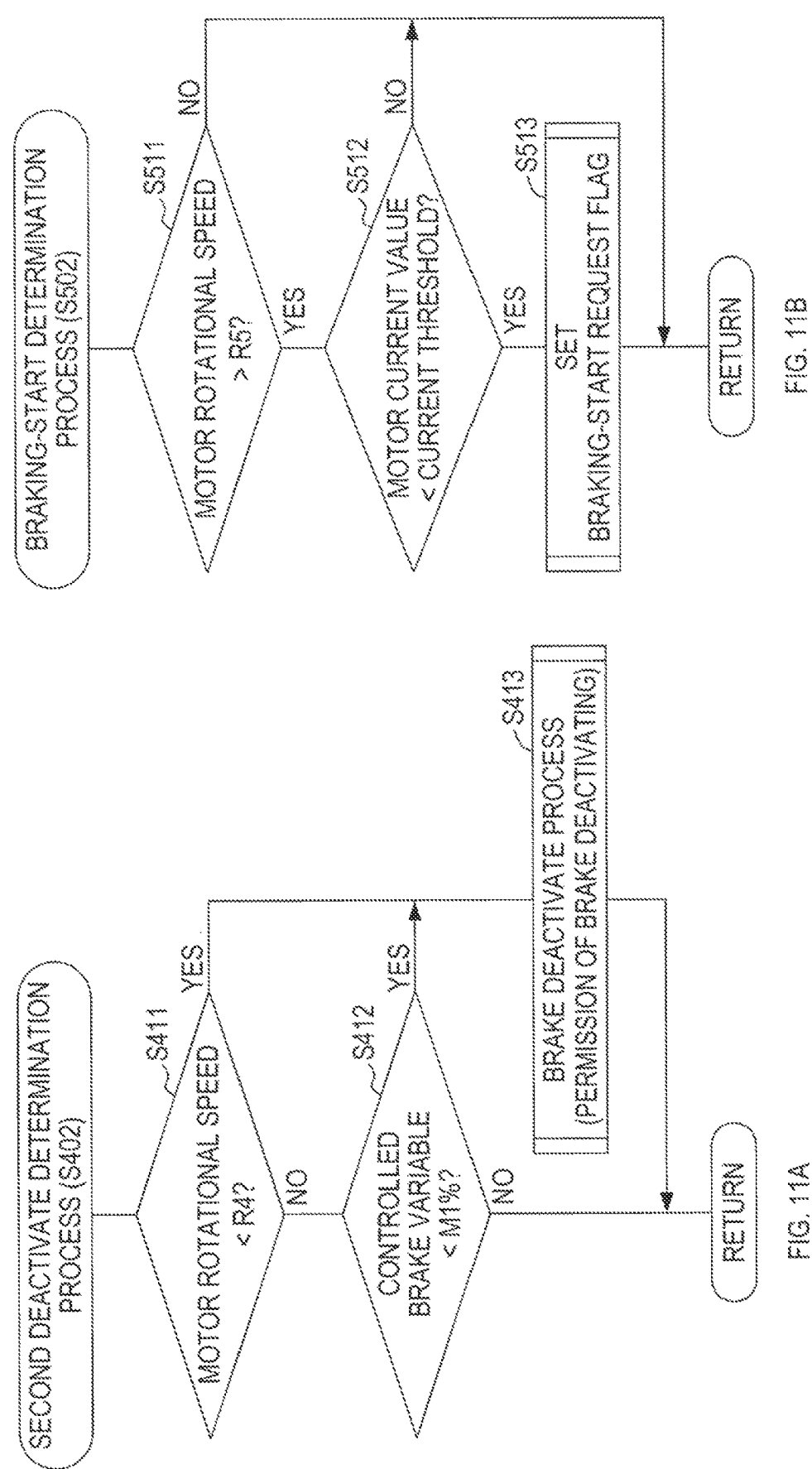
FIG. 11A is a flowchart of a second deactivating determination process.
FIG. 11B is a flowchart of a braking-start determination process.

If the motor drive requirement is satisfied in S401 (S401: YES), the control circuit 51 executes a second deactivating determination process in S402. The second deactivating determination process includes determining whether to allow the dynamic braking to be deactivated. Details of the second deactivating determination process are shown in FIG. 11A.

Proceeding to the second deactivating determination process, the control circuit 51 determines in S411 whether the motor rotational speed is below the fourth speed threshold R4. The fourth speed threshold R4 is set, for example, in accordance with the target rotational speed that is currently set. Specifically, the fourth speed threshold R4 is set to a value smaller than the target rotational speed. The fourth speed threshold R4 may be, for example, ½ of the target rotational speed. Alternatively, the fourth speed threshold R4 may be a value, for example, within a preset range including ½ of the target rotational speed. The target rotational speed is set in the target rotational speed setting process that will be below (see FIG. 13).

If the motor rotational speed is below the fourth speed threshold R4 in S411 (S411: YES), the motor 25 is rotating at the rotational speed lower than the target rotational speed. In this case, the control circuit 51 executes the brake deactivating process in S413, as in S313. When completing the brake deactivating process, the control circuit 51 proceeds to the process in S403 (see FIG. 10).

If the motor rotational speed is the fourth speed threshold R4 or higher in S411 (S411: NO), the control circuit 51 proceeds to the process in S412. In S412, the control circuit 51 determines whether the controlled brake variable that is currently set is below the variable threshold M1. If the controlled brake variable is below the variable threshold M1 (S412: YES), a large braking force is not requested. In this case, the control circuit 51 executes the brake deactivating process in S413. If the controlled brake variable is the variable threshold M1 or higher (S412: NO), the control circuit 51 proceeds to a process in S403 (see FIG. 10).

In S403, the control circuit 51 determines whether the brake deactivating is permitted. If the brake deactivating is permitted (S403: YES), the control circuit 51 sets the control mode to the drive mode in S404. When completing the process in S404, the control circuit 51 proceeds to the process in S213 (see FIG. 7).

If the brake deactivating is not permitted in S403 (S403: NO), the control circuit 51 proceeds to the process in S213 (see FIG. 7) with maintaining the second brake mode.

If the present control mode is set to the drive mode in S205 (see FIG. 7), the control circuit 51 executes the process in S501 shown in FIG. 10. If the control mode is set to the drive mode, the control circuit 51 is (i) deactivating the dynamic braking (i.e., the controlled brake variable being set to zero), and also (ii) supplying the three-phase drive power to the motor 25 to drive the motor 25.

In S501, the control circuit 51 determines whether the motor drive requirement is satisfied. If the motor drive requirement is not satisfied (S501: NO), the control circuit 51 sets the control mode to the standby mode in S505. When completing the process in S505, the control circuit 51 proceeds to the process in S213 (see FIG. 7).

If the motor drive requirement is satisfied in S501 (S501: YES), the control circuit 51 executes a braking-start determination process in S502. The braking-start determination process includes determining whether it is in a situation where the dynamic braking should be activated. Details of the braking-start determination process are shown in FIG. 11B.

Proceeding to the braking-start determination process, the control circuit 51 determines in S511 whether the motor rotational speed exceeds a fifth speed threshold R5. The fifth speed threshold R5 is set, for example, in accordance with the target rotational speed that is currently set. Specifically, the fifth speed threshold R5 is set to a value exceeding the target rotational speed. The fifth speed threshold R5 may be, for example, a rotational speed higher than the target rotational speed by a preset value.

If the motor rotational speed is the fifth speed threshold R5 or lower in S511 (S511: NO), the control circuit 51 proceeds to a process in S503 (see FIG. 10).

If the motor rotational speed exceeds the fifth speed threshold R5 in S511 (S511: YES), the control circuit 51 determines in S512 whether the motor current value that is currently detected is below a current threshold. If the motor current value is the current threshold or higher (S512: NO), the control circuit 51 proceeds to the process in S503 (see FIG. 10).

If the motor current value is below the current threshold (S512: YES), for example, it can be assumed that the motor 25 is rotating at a relatively high speed under light load. More specifically, for example, it can be assumed that it is in a situation where the battery-powered wheelbarrow 1 traveling on a flat place arrives a descending slope and, hence its own moving speed increases due to gravity.

Thus, if the motor current value is below the current threshold (S512: YES), the control circuit 51 executes a process for activating the dynamic braking. Specifically, the control circuit 51 sets a braking-start request flag in S513. When completing the process in S513, the control circuit 51 proceeds to the process in S503 (see FIG. 10). The determination process in S512 may be omitted.

In S503, the control circuit 51 determines whether the braking-start request flag is set. If the braking-start request flag is set (S503: YES), the control circuit 51 sets the control mode to the second brake mode in S504. In addition, the control circuit 51 clears the braking-start request flag in S504. When completing the process in S504, the control circuit 51 proceeds to the process in S213 (see FIG. 7).

Figure 6:
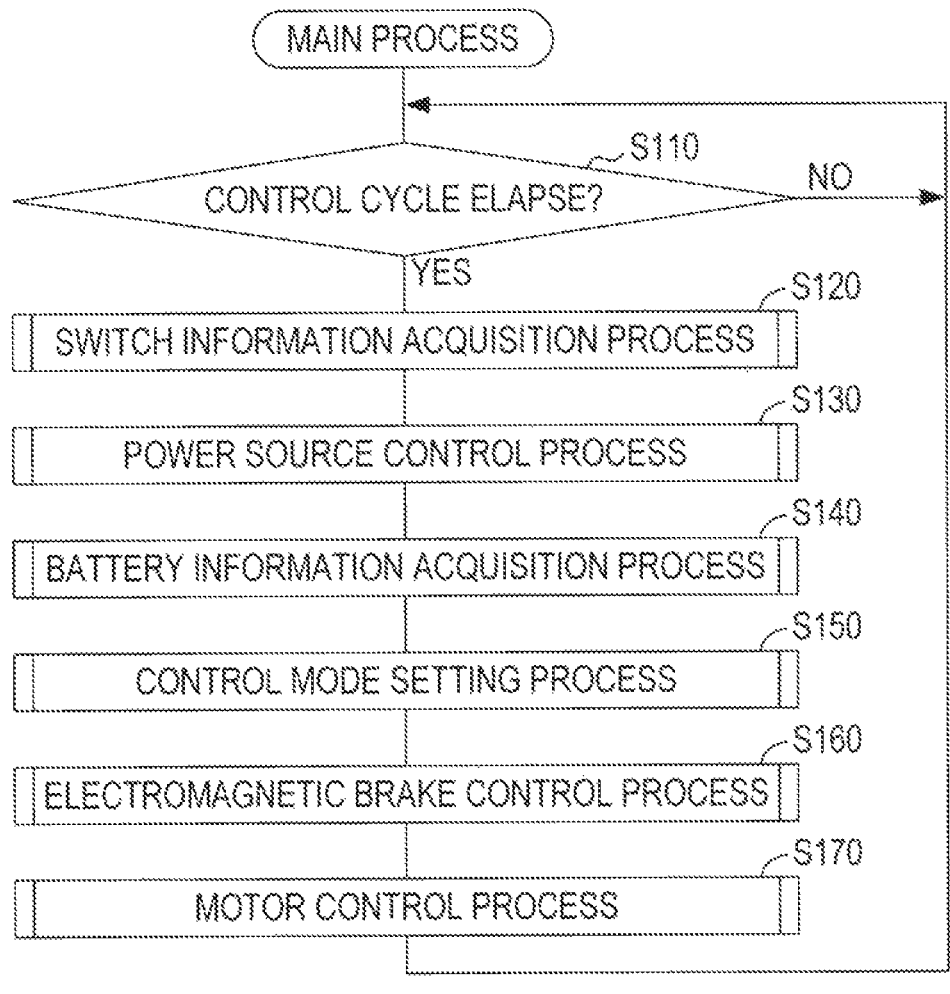
FIG. 6 is a flowchart of a main process.
Figure 12:
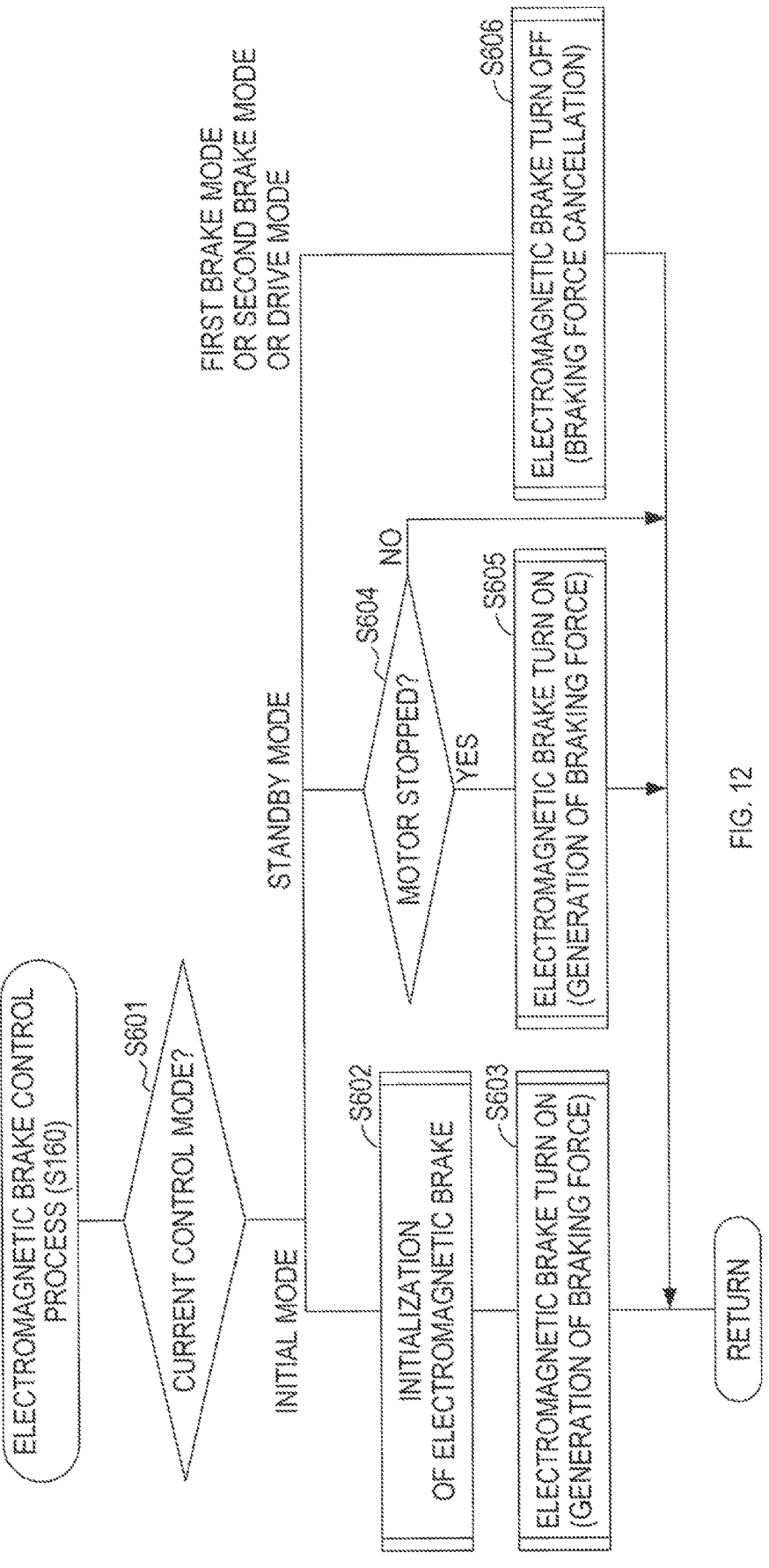
FIG. 12 is a flowchart of an electromagnetic brake control process.

When completing the control mode setting process in FIG. 7, the control circuit 51 proceeds to the process in S160 (see FIG. 6). In S160, the control circuit 51 executes an electromagnetic brake control process. Details of the electromagnetic brake control process are shown in FIG. 12.

Proceeding to the electromagnetic brake control process, the control circuit 51 determines the present control mode in S601. If the present control mode is the initial mode, the control circuit 51 executes, in S602, electromagnetic-braking process related initialisation. The control circuit 51 then turns ON the electromagnetic brake 30 in S603. Accordingly, the braking force by the electromagnetic brake 30 is generated. After the electromagnetic brake 30 is turned ON in S603, the control circuit 51 proceeds to the process in S170 (see FIG. 6).

If the present control mode is the standby mode in S601, the control circuit 51 determines in S604 whether the motor 25 is stopped, that is, in a non-rotation state. If the motor 25 is not stopped (S604: NO), the control circuit 51 proceeds to a process in S170 (see FIG. 6). If the motor 25 is stopped (S604: YES), the control circuit 51 turns ON the electromagnetic brake 30 in S605, as in S603. After the electromagnetic brake 30 is turned ON in S605, the control circuit 51 proceeds to the process in S170 (see FIG. 6). It is to be noted that the state defined as "the motor 25 is stopped" in S604 may or may not be limited to a state where the motor 25 is completely stopped (that is, the rotational speed of the motor 25 is zero). For example, the state defined as "the motor 25 is stopped" may include a state where the rotational speed of the motor 25 is a preset threshold (corresponding to one example of a third speed threshold of the overview) or lower. The preset threshold may be, for example, zero or a value approximate to zero.

If the present control mode is the first brake mode, the second brake mode, or the drive mode in S601, the control circuit 51 proceeds a process in S606. In S606, the control circuit 51 turns OFF the electromagnetic brake 30 to deactivate the braking with the electromagnetic brake 30. After turning the electromagnetic brake 30 OFF in S606, the control circuit 51 proceeds to the process in S170 (see FIG. 6).

Figure 13:
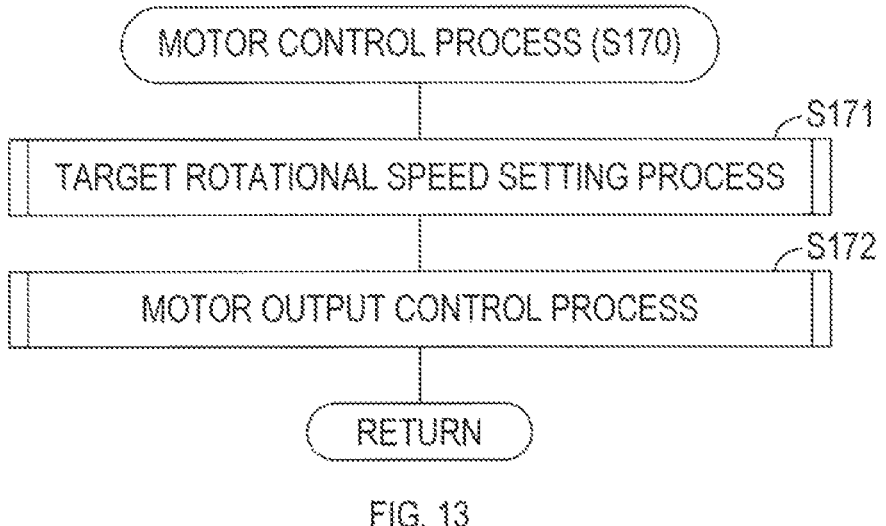
FIG. 13 is a flowchart of a motor control process.

In S170, the control circuit 51 executes the motor control process. Details of the motor control process are shown in FIG. 13.

Proceeding to the motor control process, the control circuit 51 executes the target rotational speed setting process in S171. Specifically, the control circuit 51 executes the speed mode setting process and a rotational direction specifying process. The speed mode setting process includes switching or keeping the speed mode based on the speed selector signal acquired in S120. The rotational direction specifying process includes switching or keeping the specific rotational direction based on the direction selector switch signal acquired in S120. In S171, the control circuit 51 further sets the target rotational speed and a target duty ratio, based on the speed mode set in the speed mode setting process, on the specific rotational direction in the rotational direction specifying process, and on the position of the drive lever 14a. The target duty ratio is a target value for the duty ratio of the motor control signals.

Figure 14:
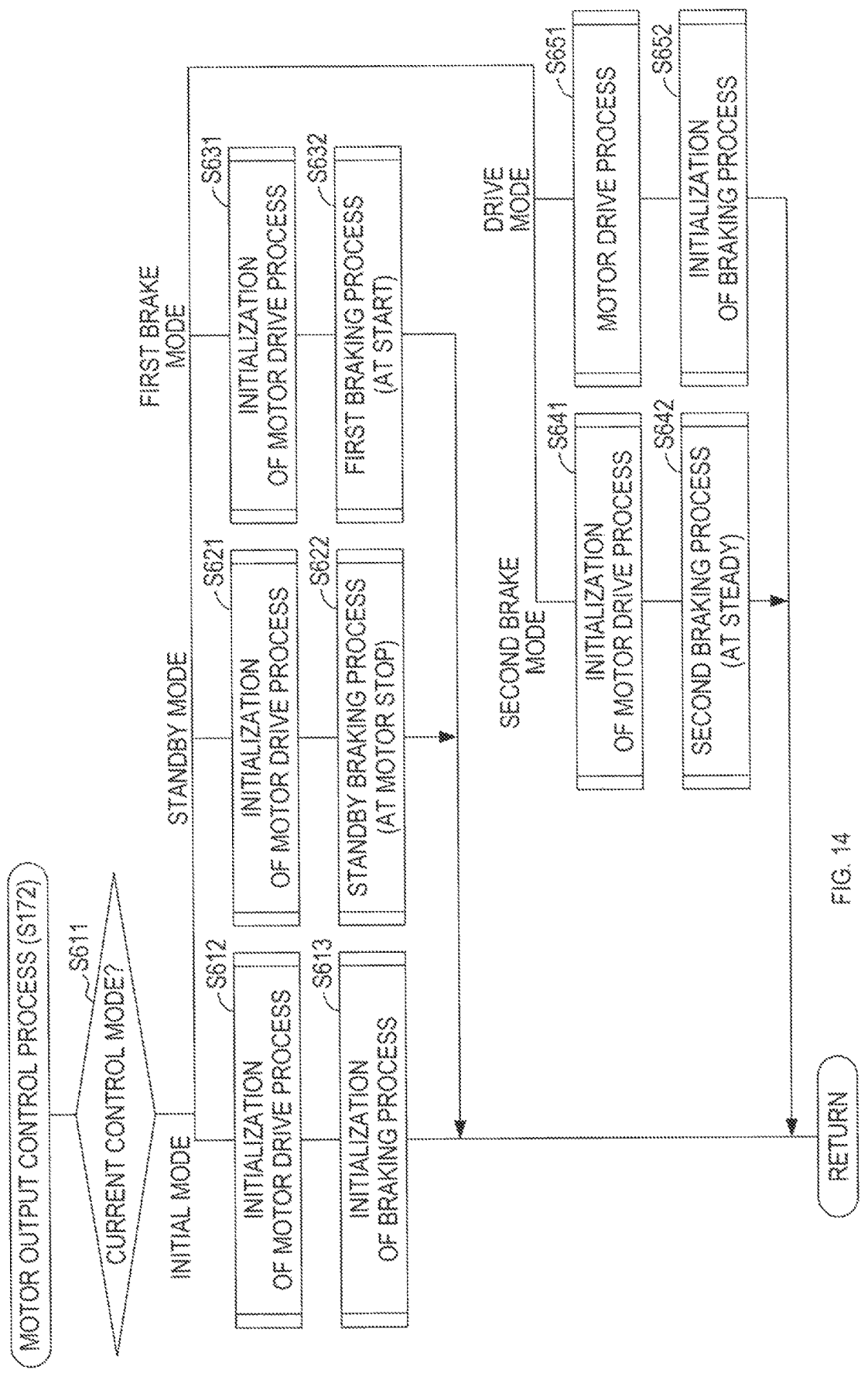
FIG. 14 is a flowchart of a motor output control process.

When completing the process in S171, the control circuit 51 executes a motor output control process in S172. Details of the motor output control process are shown in FIG. 14.

Proceeding to the motor output control process, the control circuit 51 determines the present control mode in S611. If the present control mode is the initial mode, the control circuit 51 executes initialization of a motor drive process in S612. The motor drive process is executed in S651. The motor drive process includes controlling the motor 25 such that the battery-powered wheelbarrow 1 travels at a speed in accordance with the position of the drive lever 14a, which will be described below. In S612, the control circuit 51 initializes various variables, flags, counters, and the like that have been calculated or are calculated in the motor drive process. Accordingly, the output of the motor control signals is stopped, and thus the three-phase drive power from the drive circuit 52 to the motor 25 is stopped.

In S613, the control circuit 51 executes initialization of the braking process. Specifically, the control circuit 51 sets the controlled brake variable to zero, and sets the brake target speed to zero. This causes the dynamic braking and the electromagnetic brake 30 to be turned OFF.

Figure 15:
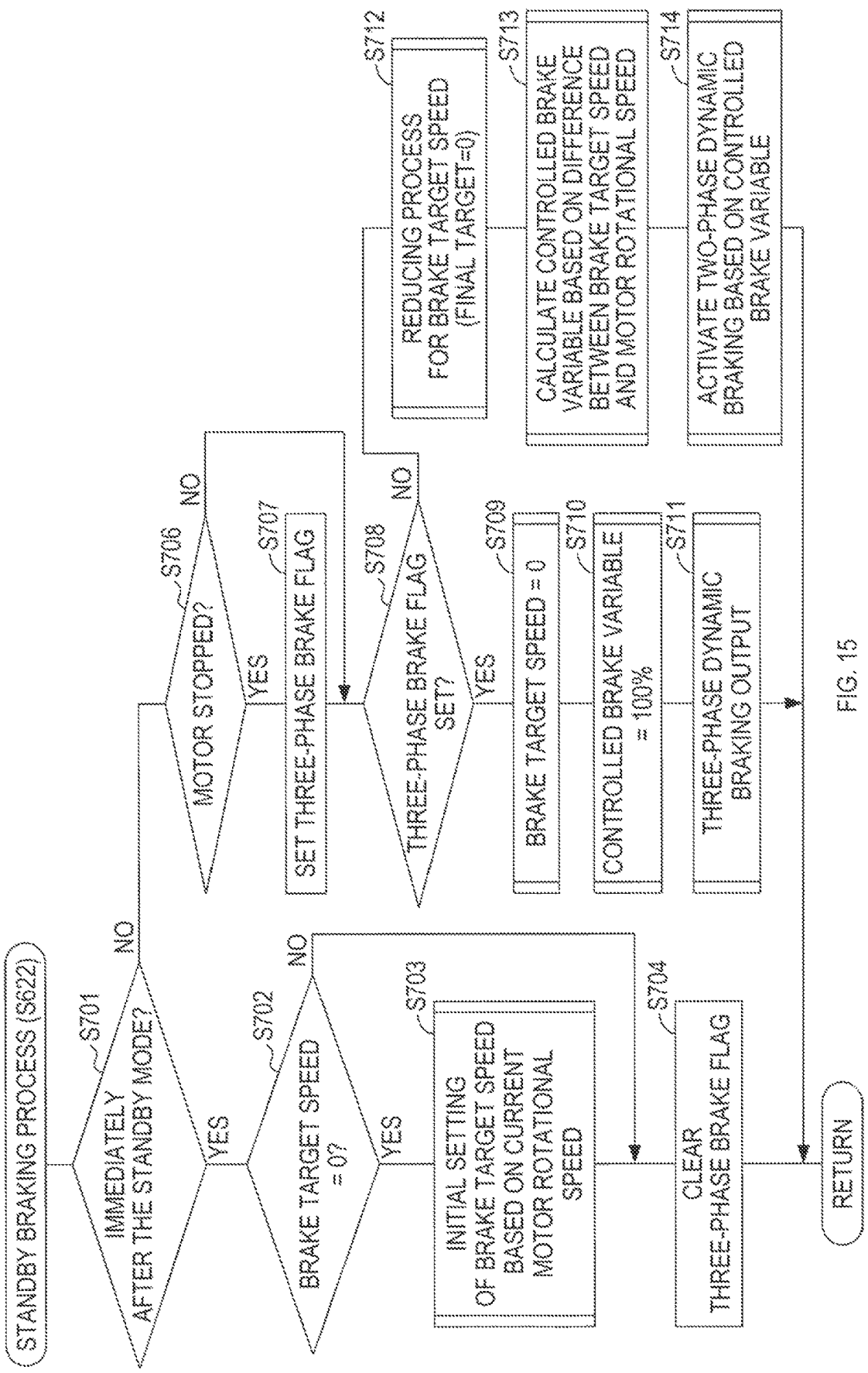
FIG. 15 is a flowchart of a standby braking process.

If the present control mode is the standby mode in S611, the control circuit 51 executes initialization of the motor drive process in S621 as in S612. When completing the process in S621, the control circuit 51 executes the standby braking process in S622. Details of a standby braking process are shown in FIG. 15.

Proceeding to the standby braking process, the control circuit 51 determines in S701 whether a present time point is immediately after transition to the standby mode. In other words, the control circuit 51 determines whether to be currently executing a first (i.e., initial) standby braking process immediately after a mode other than the standby mode is switched to the standby mode. If the currently executing standby braking process is the first standby braking process immediately after the transition to the standby mode (S701: YES), the control circuit 51 executes the process in S702.

In S702, the control circuit 51 determines whether the brake target speed that is currently set is zero. The initial value of the brake target speed is zero as described above. The brake target speed is a target value of the motor rotational speed when the motor 25 is decelerated using the two-phase dynamic braking. As will be described below, the controlled brake variable is calculated based on the brake target speed and the actual motor rotational speed such that the motor rotational speed matches (or approximates) the brake target speed.

If the brake target speed is not zero (S702: NO), the control circuit 51 proceeds to the process in S704. If the brake target speed is set to zero (S702: YES), the control circuit 51 executes the process in S703. In S703, the control circuit 51 performs an initial setting of the brake target speed based on the present motor rotational speed. Methods for initial setting in S703 may be performed in any manner. For example, the brake target speed may be set to a rotational speed lower than the present motor rotational speed by a first specific speed. Alternatively, for example, the brake target speed may be set to P % (for example, $50 < P < 100$) of the present motor rotational speed.

In S704, the control circuit 51 clears a three-phase brake flag. In the present embodiment, clearing the three-phase brake flag corresponds to deactivating the three-phase dynamic braking, that is, to generating no braking force by the three-phase dynamic braking. When completing the process in S704 (that is, completing the motor control process in S170), the control circuit 51 proceeds to S110 (see FIG. 6).

If not immediately after the transition to the standby mode in S701 (S701: NO), the control circuit 51 determines in S706 whether the motor 25 is stopped. If the motor 25 rotates (S706: NO), the control circuit 53 proceeds to a process in S708. If the motor 25 is stopped (S706: YES), the control circuit 51 sets the three-phase brake flag in S707. At a time point when the three-phase brake flag is set in S707, the three-phase dynamic braking is still not activated.

In S708, the control circuit 51 determines whether the three-phase brake flag is set. If the three-phase brake flag is set (S708: YES), the control circuit 51 proceeds to a process in S709. In S709, the control circuit 51 sets the brake target speed to zero. In S710, the control circuit 51 sets the controlled brake variable to 100%. In S711, the control circuit 51 outputs the three-phase dynamic braking. That is, the three-phase dynamic braking is activated so that the braking force by the three-phase dynamic braking is generated. When completing the process in S711, the control circuit 51 proceeds to S110 (see FIG. 6). In S710, the controlled brake variable of the two-phase dynamic braking is set to 100%. However, the first terminal to the third terminal 25U to 25W are short-circuited to each other in S711, and thus the two-phase dynamic braking is not practically activated.

If the three-phase brake flag is not set in S708 (S708: NO), the control circuit 51 proceeds to a process in S712. As one example of specific situations of proceeding from S708 to S712, there is a conceivable situation where the motor 25 is rotating by inertia or an external force.

The processes from S712 to S714 are processes for gradually reducing (or decreasing) the rotational speed of the motor 25 that is rotating (in other words, gradually increasing the braking force of the two-phase dynamic braking), thereby finally stopping rotation of the motor 25.

In S712, the control circuit 51 executes a calculation process of calculating the brake target speed. Specifically, the control circuit 51 does not immediately set the brake target speed to a final target (that is, zero). The control circuit 51 reduces (or decreases) (for example, slightly decreases) the brake target speed by a preset reduced amount from the currently set value. The calculation method for calculating the amount to be reduced is not limited. For example, a new brake target speed may be set to a value obtained by subtracting a second specific speed from the present brake target speed. In addition, for example, a new brake target speed may be set to a value obtained by subtracting Q % (for example, $0 \leq Q < 30$) of the present brake target speed from the present brake target speed.

In S713, the control circuit 51 calculates the controlled brake variable to reduce the motor rotational speed to the brake target speed. Specifically, the control circuit 51 calculates the controlled brake variable based on a difference between the present motor rotational speed and the brake target speed that is calculated in S712. More specifically, the control circuit 51 calculates the controlled brake variable such that the controlled brake variable is greater (that is, the braking force is greater) as the above-described difference is greater.

In S714, the control circuit 51 activates the two-phase dynamic braking in accordance with the controlled brake variable calculated in S713. That is, the control circuit 51 adjusts the two terminals to be short-circuited to each other and its short-circuiting period, through the drive circuit 52, such that the braking force corresponding to the controlled brake variable is generated.

The above-described processes in S712 to S714 are repeatedly executed for each control cycle. Such repeating execution leads to a gradual decrease in the brake target speed, thereby causing the motor rotational speed to decrease gradually. When completing the process in S714, the control circuit 51 proceeds to S110 (see FIG. 6).

With reference back to FIG. 14, a further description is given. If the present control mode is the first brake mode in S611, the control circuit 51 executes initialization of the motor drive process in S631, as in S612.

Figure 16:
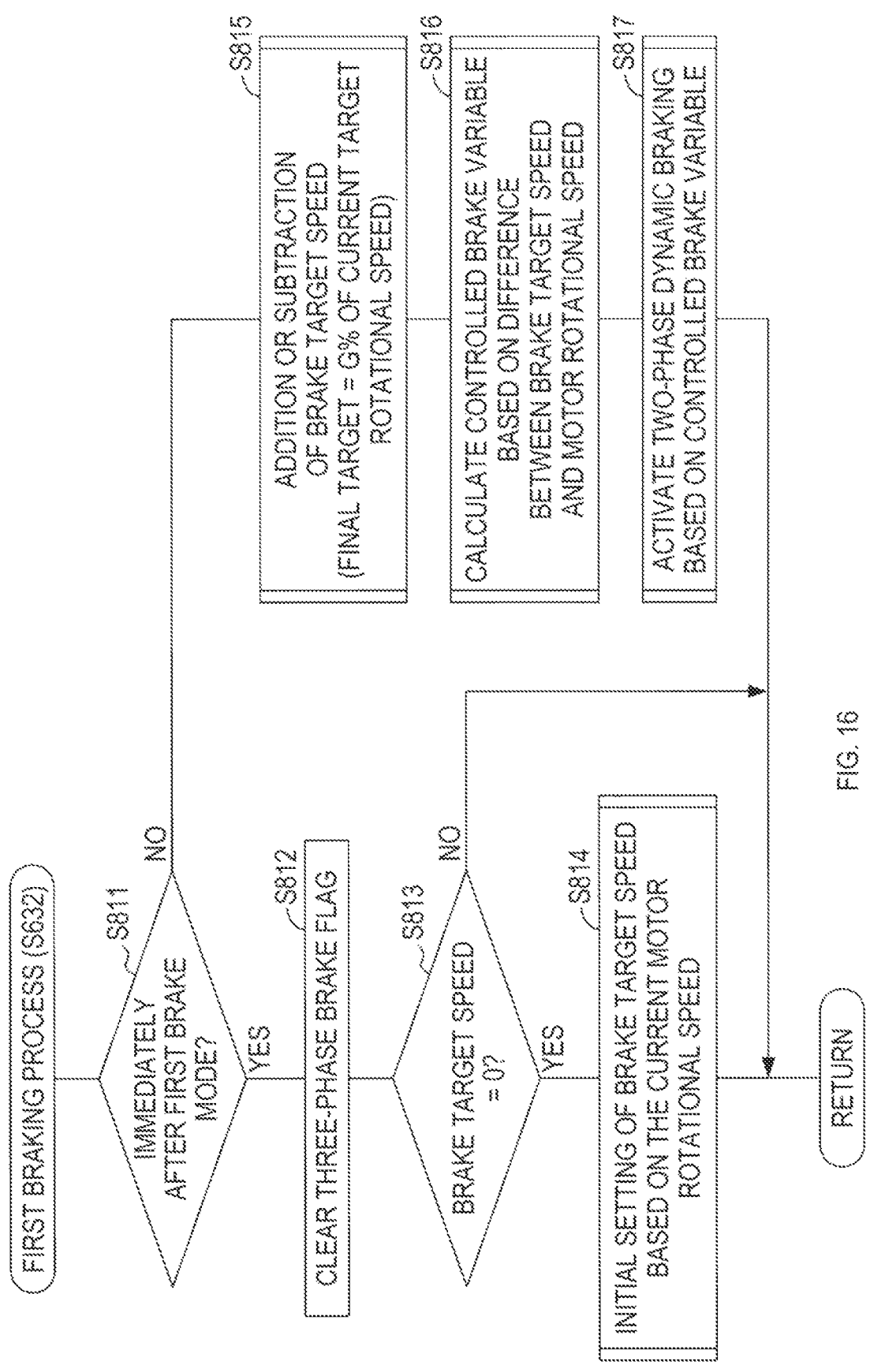
FIG. 16 is a flowchart of a first braking process.

When completing the process in S631, the control circuit 51 executes a first braking process in S632. The first braking process is executed to gradually decrease the braking force of the dynamic braking without immediately deactivating the dynamic braking, when the motor 25 with being stopped starts rotating. More specifically, the first braking process is executed in order to (i) switch the dynamic braking front the three-phase dynamic braking to the two-phase dynamic braking, and also (ii) gradually decrease the braking force of the two-phase dynamic braking. Details of the first braking process are shown in FIG. 16.

Proceeding to the first braking process, the control circuit 51 in S811 determines whether a present time point is immediately after transition to the first brake mode. In other words, the control circuit 51 determines whether to be currently executing an initial first braking process immediately after transition to the first brake mode from a control mode other than the first brake mode. If the present time point is immediately after the transition to the first brake mode (S811: YES), the control circuit 51 executes the process in S812. In S812, the control circuit 51 clears the three-phase brake flag.

In S813, the control circuit 51 determines whether the brake target speed that is currently set is zero. If the brake target speed is not zero (S813: NO), the control circuit 51 proceeds to S110 (see FIG. 6). If the brake target speed is set to zero (S813: YES), the control circuit 51 executes the process in S814. In S814, the control circuit 51 performs an initial setting of the brake target speed based on the present motor rotational speed.

The initial setting of the brake target speed in S814 is different from that in S703. In S814, for example, the brake target speed may be set to a rotational speed higher than the present motor rotational speed by a third specific speed. Alternatively, for example, L times (L>1) the present motor rotational speed may be set as the brake target speed. When completing the process in S814, the control circuit 51 proceeds to S110 (see FIG. 6).

If not immediately after the transition to the first brake mode in S811 (S811: NO), the control circuit 51 proceeds to a process in S815. In S815, the control circuit 51 performs addition (or increasing) or subtraction (or decreasing) on the brake target speed. That is, the brake target speed is increased or decreased. Specifically, the control circuit 51 defines a final target of the brake target speed. For example, the control circuit 51 may set, as a final target of the brake target speed, G % (G<100) of the target rotational speed that is currently set. The value of G % may be any value below 100%, for example, may be 50% or more (e.g., 80%).

The control circuit 51 does not immediately set the brake target speed to the final target. The control circuit 51 decreases (for example, slightly decreases) or increases (for example, slightly increases) the brake target speed from the present brake target speed so that the brake target speed approximates the final target more than the present brake target speed. In other words, the control circuit 51 repeatedly executes the process in S815 alter the next and subsequent control cycles to adjust the brake target speed, such that the brake target speed gradually approximates the final target.

The calculation method for calculating the amount to be decreased or increased in S815 is not limited. For example, a value obtained by subtracting or adding a fourth specific speed from or to the present brake target speed may be set as a new value of the brake target speed. Alternatively, for example, a value obtained by subtracting or adding J % (for example, 0<J<30) of the present brake target speed from or to the present brake target speed may be set as a new brake target speed.

In S816, the control circuit 51 calculates the controlled brake variable based on a difference between the present motor rotational speed and the brake target speed that is calculated in S815. Specifically, the control circuit 51 calculates the controlled brake variable such that the controlled brake variable is smaller (that is, the braking force is smaller) as the motor rotational speed is smaller than the brake target speed, in order to increase the rotational speed to the brake target speed.

In S817, the control circuit 51 activates the two-phase dynamic braking in accordance with the controlled brake variable calculated in S816.

The above-described processes in S815 to S817 are repeatedly executed for each control cycle, thereby increasing the brake target speed gradually. It can be thus expected that the battery-powered wheelbarrow 1 is stopped, for example, on a flat place (and thus, the motor 25 does not rotate), remaining there even if the controlled brake variable is decreased in accordance with an increase in the brake target speed. In this case, it can be thus assumed that, for example, a situation of proceeding from the above-described S315 to S317 arises, resulting in deactivating of the dynamic braking.

Figure 17:
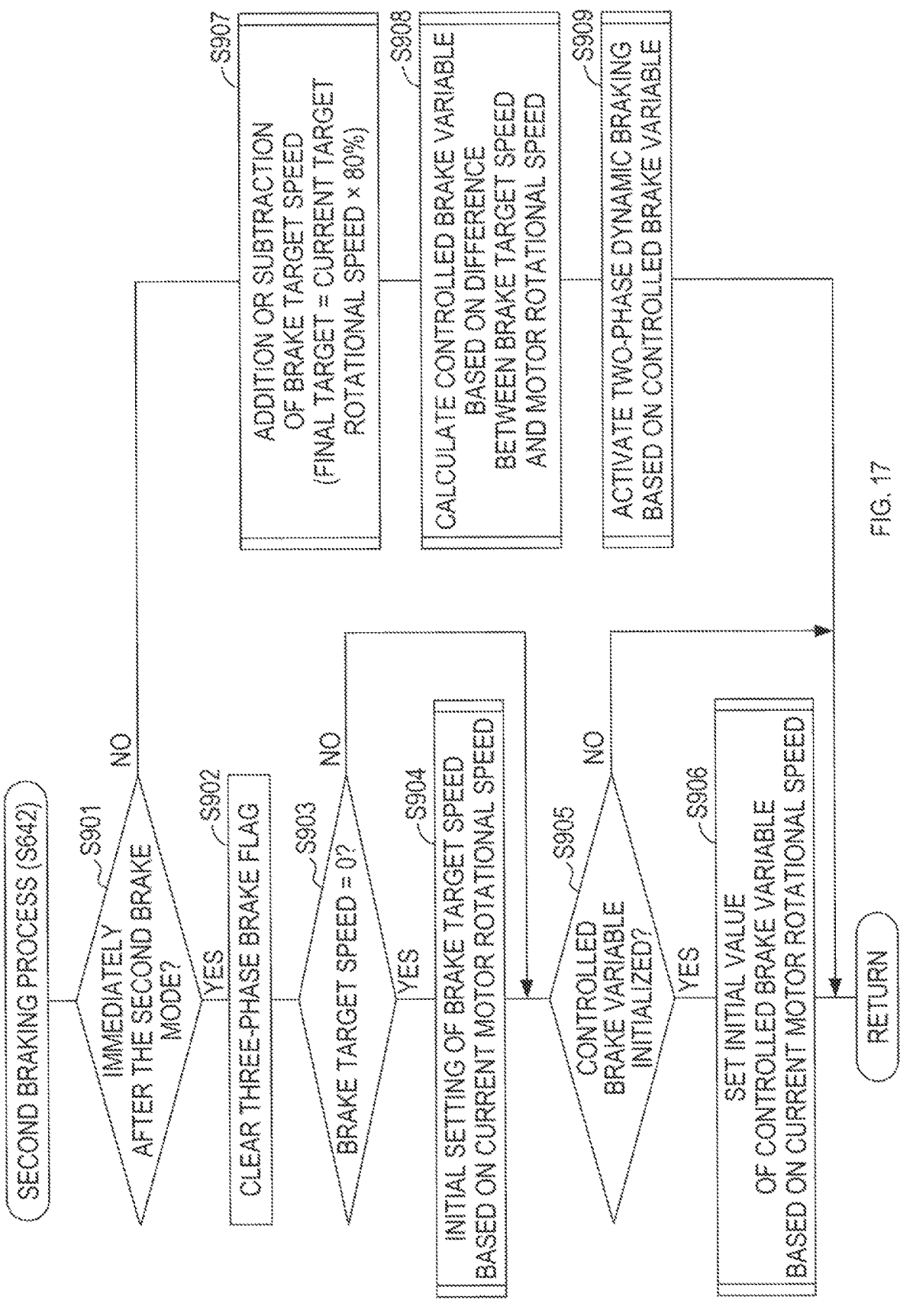
FIG. 17 is a flowchart of a second braking process.

Further, for example, when the battery-powered wheelbarrow 1 is at a standstill on a descending slope, if the motor drive requirement is satisfied and the electromagnetic brake 30 is deactivated, it can be assumed that the battery-powered wheelbarrow 1 start gradually moving due to gravity (that is, the motor 25 start gradually rotating). However, the two-phase dynamic braking is activated in this case, so that the motor rotational speed does not rapidly increase. In this case, the controlled brake variable decreases in accordance with the increase in the brake target speed. This leads to an increase in the moving speed of the battery-powered wheelbarrow 1. When the moving speed of the battery-powered wheelbarrow on the descending slope increases in such a manner, it can be expected that, for example, a described-below second braking process (see FIG. 17) is executed and the two-phase dynamic braking is kept.

With reference back to FIG. 14, a further description is given. If the present control mode is the second brake mode in S611, the control circuit 51 executes initialization of the motor drive process in S641, as in S612.

When completing the process in S641, the control circuit 51 executes the second braking process in S642. The second braking process is executed, as one example, assumed that the battery-powered wheelbarrow 1 moves downward on a descending slope due to gravity. More specifically, the second braking process is executed to suppress acceleration of the motor 25 using the two-phase dynamic braking in the aforementioned situation.

Proceeding to the second braking process, the control circuit 51 determines in S901 whether a present time point is immediately after transition from a mode other than the second brake mode to the second brake mode. In other words, the control circuit 51 determines whether to be currently executing an initial second braking process after the control mode is switched from the mode other than the second brake mode to the second brake mode. If immediately after switching to the second brake mode (S901: YES), the control circuit 51 executes the process in S902. In S902, the control circuit 51 clears the three-phase brake flag.

In S903, the control circuit 51 determines whether the brake target speed that is currently set is zero. If the brake target speed is not zero (S903: NO), the control circuit 51 proceeds to S905. If the brake target speed is set to zero (S903: YES), the control circuit 51 executes the process in S904. In S904, the control circuit 51 performs an initial setting of the brake target speed based on the present motor rotational speed, as in S814.

In S905, the control circuit 51 determines whether the controlled brake variable is initialized. The controlled brake variable is initialized (for example, set to zero) in S613 (described above) and S6S2 (will be described below). If the controlled brake variable is not initialized (S905: NO), the control circuit 51 proceeds to S110 (see FIG. 6). If the controlled brake variable is initialized (S905: YES), the control circuit 51 executes the process in S906. In S906, the control circuit 51 sets an initial value of the controlled brake variable based on the present motor rotational speed. For example, the control circuit 51 sets the initial value of the controlled brake variable such that the controlled brake variable is greater as the motor rotational speed is higher. When completing the process in S906, the control circuit 51 proceeds to S110 (see FIG. 6).

If not immediately after transition to the second brake mode in S901 (S901: NO), the control circuit 51 executes the processes in S907 to S909. The processes S907 to S909 in the present embodiment, for example, are the same as those in S815 to S817 shown in FIG. 16. Therefore, explanation for S907 to S909 is omitted.

With reference back to FIG. 14, a further description is given. If the present control mode is the drive mode in S611, the control circuit 51 executes the motor drive process in S651. The motor drive process includes controlling driving of the motor 25 based on the target rotational speed and the target duty ratio that are set in S171. In the present embodiment, the control circuit 51 performs, for example, a constant duty control, and then switches it to a constant rotation control. In the constant duty control, the motor 25 is controlled based on the target duty ratio. In the constant rotation control, the motor 25 is controlled based on the target rotational speed.

Now, the method for setting the target rotational speed and the target duty ratio in S171 is supplementally described. In S173, the control circuit 51 sets a target duty in accordance with a moved length of the drive lever 14a. For example, if the moved length is a moved length threshold or smaller (hereinafter, referred to as "at a short moved"), the control circuit 51 sets the target duty ratio to a first target duty ratio. For example, if the moved length exceeds the moved length threshold (hereinafter, referred to as "at a long moved"), the control circuit 51 sets the target duty ratio to a second target duty ratio. The second target duty ratio is greater than the first target duty ratio.

In S171, the control circuit 51 further sets an initial duty ratio and an initial output period in accordance with the moved length. Specifically, the control circuit 51 sets the initial duty ratio to a first initial duty ratio at the short moved. The first initial duty ratio is smaller than the first target duty ratio. For example, the control circuit 51 sets the initial duty ratio to a second initial duty ratio at the long moved. The second initial duty ratio is smaller than the second target duty ratio, and greater than the first initial duty ratio. Further, the control circuit 51 sets the initial output period to a first initial output period at the short moved. For example, the control circuit 51 sets the initial output period to a second initial output period at the long moved. The second initial output period is shorter than the first initial output period.

The control circuit 51 sets duty ratio of the motor control signals to the initial duty ratio at start of the motor drive process to drive the motor 25. For example, the motor control signals of the first initial duty ratio are outputted at the short moved. The control circuit 51 continues to output the motor control signals of the initial duty ratio for the initial output period. For example, at the long moved, the motor control signals of the second initial duty ratio are continued to output for the second initial output period.

After a lapse of the initial output period, the control circuit 51 gradually increases the duty ratio of the motor control signals from the initial duty ratio to the target duty ratio. An increasing manner of the duty ratio varies depending on the moved length. For example, it spends more time to increase the duty ratio to the target duty ratio at the short moved than that at the long moved. A tendency to increase the duty ratio at the long moved may be, for example, like a straight line. The tendency to increase the duty ratio at the short moved may be for example, exponential.

During execution of the constant duty control, the control circuit 51 switches the control method to the constant rotation control in response to a control switching requirement being satisfied. The control switching requirement is satisfied, for example, in response to the following first state to third state are simultaneously being continued for a predefined time period. The first state corresponds to a state in which the duty ratio of the motor control signals reaches K % (K<100) of the target duty ratio. The second state corresponds to a stale in which the motor rotational speed exceeds a sixth speed threshold R6. The third state is a state in which a second predefined time period elapses from the output start of the motor control signals of the initial duty ratio.

If the control circuit 51 switches the control method to the constant rotation control, the control circuit 51 performs a PI control (proportional integral control) of the duty ratio of the motor control signals such that the motor rotational speed matches the target rotational speed. A control gain used in the PI control is greater at the long moved than that at the short moved.

The above-described control of the motor 25 during the drive mode is achieved by repeating execution of the motor drive process in S651 for each control cycle. During the drive mode, S651 to S652 are repeatedly executed for each control cycle. In S652, the braking process is initialized as in S613. Accordingly, the electromagnetic brake 30 and the dynamic braking both are deactivated during the drive mode.

(5) Correspondence Between Embodiment and Overview

The drive lever 14*a* corresponds to one example of a first manual switch of the overview. The brake lever 13*b* corresponds to one example of a second manual switch of the overview.

Executing S304 in response to the execution of S313, and then executing S652 correspond to one example of "deactivate the dynamic braking through the drive circuit in response to (i) a first additional requirement being satisfied, and also (ii) the first transition having occurred or occurring" of the overview. Executing S304 in response to the execution of S317, and then executing S652 correspond to one example "deactivate the dynamic braking through the drive circuit, in response to a second additional requirement being satisfied after the first transition occurs" of the overview. The process in S605 corresponds to one example of "activate the electromagnetic brake during (i) the drive requirement not being satisfied" of the overview. The process in S606 corresponds to one example of "deactivate the electromagnetic brake in response to the first transition having occurred or occurring" of the overview. The processes from S709 to S713 corresponds to one example of "activate the dynamic braking through the drive circuit during a drive requirement of the motor not being satisfied" of the overview. The processes from S816 to S817 correspond to one example of "in response to a first transition having occurred or occurring from the drive requirement not being satisfied to the drive requirement being satisfied, decrease the dynamic braking through the drive circuit in accordance with a lapse of time" of the overview.

Other Embodiments

Although one embodiment to implement the overview has been described above, the overview is not limited to the above-described embodiments, but may be implemented in various modified forms.

(1) The dynamic braking to be activated when the motor 25 is stopped may be the two-phase dynamic braking, and also may be selectively switched between the three-phase dynamic braking and the two-phase dynamic braking. During the rotation of the motor 25, the three-phase dynamic braking may be temporarily activated.

(2) The battery-powered wheelbarrow 1 may have one wheel, or two or more wheels, or may have five wheels or more. A battery-powered wheelbarrow including two or more wheels may have any driving wheels driven by a motor.

(3) The battery-powered wheelbarrow 1 may have only one battery pack attachable thereto, and may have more than two battery packs attachable thereto.

(4) A plurality of functions performed by a single element in the above-described embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the above-described embodiments may be omitted. Moreover, at least a part of a configuration in the above-described embodiments may be added to, or may replace, another configuration in the above-described embodiments.

What is claimed is:

1. A battery-powered wheelbarrow, comprising:
   a platform;
   a handle configured to be gripped by a user of the battery-powered wheelbarrow;
   a battery housing configured to accommodate a battery therein;
   a brushless DC motor including a first winding, a second winding, a third winding, a first terminal, a second terminal, and a third terminal, the first winding, the second winding, and the third winding being connected to the first terminal, the second terminal, and the third terminal;
   a front wheel configured to be driven by the brushless DC motor;

a drive circuit configured to:

connect the first terminal, the second terminal, and the third terminal to the battery in the battery housing so as to drive the brushless DC motor; and short-circuit at least two of the first terminal, the second terminal, and the third terminal so as to activate a dynamic braking in the brushless DC motor;

a control circuit electrically connected to the drive circuit, the control circuit being programmed to:

activate the dynamic braking through the drive circuit during (i) a drive requirement of the brushless DC motor not being satisfied, and also (ii) the brushless DC motor being stopped;

in response to a first transition having occurred or occurring from the drive requirement not being satisfied to the drive requirement being satisfied, during the brushless DC motor being stopped, decrease the dynamic braking through the drive circuit in accordance with a lapse of time, in response to a rotational speed of the brushless DC motor having stayed at a threshold or lower for a preset period of time after the first transition occurs, drive the brushless DC motor; and in response to a second transition having occurred or occurring, from the drive requirement being satisfied to the drive requirement not being satisfied, during the brushless DC motor rotating, increase the dynamic braking through the drive circuit in accordance with a lapse of time; and a manual switch configured (i) to be manually operated by the user and (ii) to output a first signal to the control circuit in response to the manual switch having been manually operated or being manually operated, the first signal requesting the control circuit to drive the brushless DC motor, wherein the drive requirement is satisfied with the manual switch having been manually operated or being manually operated.

2. A battery-powered wheelbarrow, comprising:

a battery housing configured to accommodate a battery therein;

a motor including two or more windings and two or more terminals, the two or more windings being connected to the two or more terminals;

a wheel configured to be driven by the motor;

a drive circuit configured to:

connect the two or more terminals to the battery in the battery housing so as to drive the motor; and short-circuit at least two of the two or more terminals so as to activate a dynamic braking in the motor;

a control circuit configured to:

activate the dynamic braking through the drive circuit during a drive requirement of the motor not being satisfied, and in response to a first transition having occurred or occurring from the drive requirement not being satisfied to the drive requirement being satisfied, decrease the dynamic braking through the drive circuit in accordance with a lapse of time; and a first manual switch configured (i) to be manually operated by a user of the battery-powered wheelbarrow and (ii) to output a first signal to the control circuit in response to the first manual switch having been manually operated or being manually operated, the first signal requesting the control circuit to drive the motor, wherein the drive requirement is satisfied with the first manual switch having been manually operated or being manually operated.

3. The battery-powered wheelbarrow according to claim 2, wherein the control circuit is further configured to deactivate the dynamic braking through the drive circuit in response to (i) a first additional requirement being satisfied, and also (ii) the first transition having occurred or occurring.

4. The battery-powered wheelbarrow according to claim 3, wherein the first additional requirement is satisfied with a rotational speed of the motor reaching a first threshold.

5. The battery-powered wheelbarrow according to claim 3, wherein the control circuit is configured to, in response to a second transition having occurred or occurring from the drive requirement being satisfied to the drive requirement not being satisfied, during the motor rotating, increase the dynamic braking through the drive circuit in accordance with a lapse of time.

6. The battery-powered wheelbarrow according to claim 5, wherein the first additional requirement is satisfied with (i) the rotational speed of the motor reaching the first threshold, and also (ii) a magnitude of the dynamic braking being smaller than a preset magnitude.

7. The battery-powered wheelbarrow according to claim 2, wherein the control circuit is further configured to deactivate the dynamic braking through the drive circuit, in response to a second additional requirement being satisfied after the first transition occurs.

8. The battery-powered wheelbarrow according to claim 7, wherein the second additional requirement is satisfied with a third additional requirement being satisfied, and wherein the third additional requirement is satisfied with the rotational speed of the motor having stayed at a second threshold speed or lower for a first preset period of time from a first time point, the first time point arriving after the first transition occurs.

9. The battery-powered wheelbarrow according to claim 8, wherein the second threshold corresponds to the rotational speed of zero.

10. The battery-powered wheelbarrow according to claim 8, wherein the second additional requirement is satisfied with the third additional requirement being satisfied after a fourth additional requirement is satisfied, wherein the fourth additional requirement is satisfied with a second preset period of time elapsing from a second time point after the first transition occurs, and wherein the first time point is a time point after the fourth additional requirement is satisfied.

11. The battery-powered wheelbarrow according to claim 7, wherein the control circuit is further configured to:

specify a rotational direction of the motor, and control the motor via the drive circuit such that the motor rotates in the rotational direction specified, wherein the second additional requirement is satisfied with a fifth additional requirement being satisfied, and wherein the fifth additional requirement is satisfied with the motor rotating in a direction opposite to the rotational direction specified.

12. The battery-powered wheelbarrow according to claim 11, wherein the second additional requirement is satisfied with the fifth additional requirement being satisfied after a fourth additional requirement is satisfied, and wherein the fourth additional requirement is satisfied with a second preset period of time elapsing from a second time point after the first transition occurs.

13. The battery-powered wheelbarrow according to claim 2, further comprising:

a second manual switch configured to be manually operated by the user; and a mechanical brake configured to directly brake rotation of the wheel in response to the second manual switch being manually operated, wherein the drive requirement is satisfied with (i) the first manual switch having been manually operated or being manually operated, and also (ii) the mechanical brake being deactivated.

14. The battery-powered wheelbarrow according to claim 2, further comprising:

an electromagnetic brake (i) including an electromagnet, and also (ii) configured to generate a magnetic force via the electromagnet to thereby brake the motor or to release the motor from braking.

15. The battery-powered wheelbarrow according to claim 14, wherein the control circuit is further configured to activate the electromagnetic brake during (i) the drive requirement not being satisfied, and also (ii) the rotational speed of the motor being a third threshold or lower.

16. The battery-powered wheelbarrow according to claim 14, wherein the control circuit is further configured to deactivate the electromagnetic brake in response to the first transition having occurred or occurring.

17. The battery-powered wheelbarrow according to claim 2, wherein the two or more terminals include a first terminal, a second terminal, and a third terminal, wherein the drive circuit is configured to deliver a three-phase electric power to the first terminal, the second terminal, and the third terminal, and wherein the control circuit is configured to, during the motor being stopped, short-circuit the first terminal, the second terminal, and the third terminal to each other.

18. The battery-powered wheelbarrow according to claim 2, wherein the two or more terminals include a first terminal, a second terminal, and a third terminal, wherein the drive circuit is configured to deliver a three-phase electric power to the first terminal, the second terminal, and the third terminal, and wherein the control circuit is configured to, during the motor rotating, (i) short-circuit two terminals of the first terminal, the second terminal, and the third terminal to each other, and/or (ii) short-circuit the first terminal, the second terminal, and the third terminal to each other.

19. The battery-powered wheelbarrow according to claim 2, further comprising:

an electromagnetic brake (i) including an electromagnet, and also (ii) configured to generate a magnetic force via the electromagnet to thereby brake the motor or to release the motor from braking, wherein the control circuit is configured to:

during the drive requirement not being satisfied and also the motor being stopped, activate the dynamic braking through the drive circuit and also activate the electromagnetic brake; and in response to the first transition having occurred or occurring during the motor being stopped, (i) deactivate the electromagnetic brake in advance of the dynamic braking and also (ii) decrease the dynamic braking through the drive circuit in accordance with a lapse of time.

20. A method of controlling a dynamic braking in a battery-powered wheelbarrow, the method comprising:

during a drive requirement of a motor of the battery-powered wheelbarrow being not satisfied, activating the dynamic braking of the motor to thereby inhibit the battery-powered wheelbarrow from moving, the drive requirement being satisfied with a manual switch having been manually operated or being manually operated, the manual switch being configured to request the battery-powered wheelbarrow to drive the motor in response to the manual switch having been manually operated or being manually operated; and in response to the drive requirement being satisfied, decreasing the dynamic braking in accordance with a lapse of time to thereby allow the battery-powered wheelbarrow to move.

* * * * *